US012784042B2

(12) United States Patent
Marsh

(10) Patent No.: US 12,784,042 B2
(45) Date of Patent: *Nov. 3, 2026

(54) HIERARCHY-BASED DISTRIBUTED LEDGER

(71) Applicant: CITIBANK, N.A., New York, NY (US)

(72) Inventor: Ryan Marsh, Billericay (GB)

(73) Assignee: CITIBANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/061,218

(22) Filed: Feb. 24, 2025

(65) Prior Publication Data

US 2025/0209452 A1 Jun. 26, 2025

Related U.S. Application Data

(63) Continuation of application No. 18/585,813, filed on Feb. 23, 2024, now Pat. No. 12,260,403, which is a (Continued)

(51) Int. Cl.
*G06Q 20/38* (2012.01)
*G06F 16/23* (2019.01)
(Continued)

(52) U.S. Cl.
CPC ....... *G06Q 20/389* (2013.01); *G06F 16/2379* (2019.01); *G06Q 20/405* (2013.01); *G06Q 40/04* (2013.01); *G06Q 20/3827* (2013.01)

(58) Field of Classification Search
None
See application file for complete search history.

(56) References Cited

U.S. PATENT DOCUMENTS 10,121,025 B1 * 11/2018 Rice ........................ G06F 21/10
11,488,161 B2 * 11/2022 Soundararajan ....... G06Q 20/06
(Continued)

FOREIGN PATENT DOCUMENTS

GB 2577751 A * 4/2020 ......... H04L 67/1097
WO WO-2019/164926 A1 8/2019

OTHER PUBLICATIONS

Extended European Search Report dated Apr. 30, 2024 on EPO App. 21892557.6 (9 pages).
(Continued)

*Primary Examiner* — Christopher Bridges
(74) *Attorney, Agent, or Firm* — Foley & Lardner LLP

(57) ABSTRACT

A computer-implemented method comprising receiving a request to execute a transaction transferring transaction data from a first account to a second account associated with a second computing device in communication with a distributed ledger, the request comprising an identification of the first account and the second account; identifying a third account associated with a third computing device in communication with the distributed ledger; retrieving first account data for the first account and third account data for the third account from the distributed ledger; comparing a first value from the first account data and a third value from the third account data to a threshold; determining the transaction satisfies a transaction policy; and generating a record in the distributed ledger indicating the transaction transferring the transaction data from the first account to the second account in response to the determination that the transaction satisfies the transaction policy.

20 Claims, 8 Drawing Sheets

Related U.S. Application Data continuation of application No. 17/537,445, filed on Nov. 29, 2021, now Pat. No. 11,928,677, which is a continuation-in-part of application No. 17/096,620, filed on Nov. 12, 2020, now Pat. No. 11,676,144.

(51) Int. Cl.
*G06Q 20/40* (2012.01)
*G06Q 40/04* (2012.01)

(56) References Cited

U.S. PATENT DOCUMENTS

| | | | | |
|---|---|---|---|---|
| 2017/0243177 | A1* | 8/2017 | Johnsrud | G06Q 20/10 |
| 2018/0253702 | A1 | 9/2018 | Dowding | |
| 2019/0251590 | A1* | 8/2019 | Bodington | G06Q 30/02 |
| 2019/0295050 | A1* | 9/2019 | Chalkias | G06Q 20/3829 |
| 2020/0051067 | A1 | 2/2020 | Overholser et al. | |
| 2020/0119926 | A1 | 4/2020 | Buki | |
| 2020/0160320 | A1 | 5/2020 | Williams et al. | |
| 2020/0410491 | A1* | 12/2020 | Ronnow | G06F 16/2379 |

OTHER PUBLICATIONS

International Search Report and Written Opinion for PCT/US2021/056423 dated Feb. 1, 2022 (18 pages).
Extended European Search Report on EP Application No. 25217683.9 dated Feb. 18, 2026 (11 pages).

* cited by examiner

Prior Art

HIERARCHY-BASED DISTRIBUTED LEDGER

CROSS-REFERENCE TO RELATED APPLICATIONS

This application claims the benefit of priority as a continuation of U.S. application Ser. No. 18/585,813, filed Feb. 23, 2024, which claims the benefit of priority as a continuation of U.S. application Ser. No. 17/537,445, filed Nov. 29, 2021, which is a continuation-in-part of U.S. Non-Provisional application Ser. No. 17/096,620, filed Nov. 12, 2020, each of which is hereby incorporated by reference in its entirety.

TECHNICAL FIELD

This application relates generally to implementing a hierarchical data structure using blockchain-based and other forms of distributed or shared ledger technology.

BACKGROUND

As the processing power of computers allows for greater computer functionality and the Internet technology era allows for interconnectivity between computing systems, many institutions are shifting towards distributed ledger-based technology to store and maintain the integrity of transaction data. While distributed ledger-based storage methods may require more computational resources than conventional methods (e.g., a central database), the immutability of the data within the distributed ledger enables operators to have peace of mind that the data in the distributed ledger is accurate and will not be changed.

In some instances, large organizations that manage transactions between many legal entities may use distributed ledger-based technology to keep track of the transactions. The legal entities may fall under the same corporate umbrella, or they may be within completely separate corporations but have some form of counterparty relationships, each of the legal entities may maintain its own traditional or distributed ledger to keep track of any transactions it performs and its current financial status. The use of traditional ledgers results in duplication and may be deemed to be inefficient. Additionally given the large amount of computational resources that are required to maintain just one distributed ledger, maintaining separate distributed ledgers for many legal entities may incur a large processing burden for each entity.

The processing burden may require a corporation to utilize more processors and memory and, in some cases, may cause the corporation to maintain data warehouses or server farms that are dedicated to storing the transaction data. Such processing may also incur increased electricity usage given the amount of energy nodes expend as they verify block instances each time they add a new block to the respective distributed ledger. This problem may be exacerbated as the number of legal entities and corresponding distributed ledgers that fall under the organization increases given the large number of nodes that are often needed to maintain the integrity of individual distributed ledgers to stop malicious parties from gaining control of the data.

SUMMARY

For the aforementioned reasons, there is a need for a method to maintain a centralized distributed ledger that is accessible to multiple legal entities without requiring each legal entity to maintain its own distributed ledger. The method aims to provide functionality that enables each legal entity to contribute to the distributed ledger while maintaining the privacy of any transactions to which it commits. Disclosed herein are systems and methods for creating a hierarchy-based distributed ledger that enables related legal entities to append transactions using a rule and/or hierarchy-based method. The systems and methods may also enable transactions to be added to the distributed ledger without a quorum of all of the nodes that maintain the distributed ledger verifying the authenticity of the transaction.

Implementations of the systems and methods described herein may integrate hierarchy files and scripted executable code (e.g., workflow tools or smart contracts), or distributed ledger addresses into a central distributed ledger so nodes that maintain the distributed ledger may more easily determine how to authenticate transactions between internal nodes. For example, if an investor node and an issuer node of the distributed ledger seek to enter into a transaction, the investor node may submit a transaction request to the other nodes that maintain the distributed ledger and the nodes may check the hierarchy and/or the rules of a workflow or smart contract to determine the requirements for the transaction to be approved (e.g., for a block instance to be appended to the blockchain). The nodes may determine that only a set of nodes at a predetermined tier of the hierarchy above the investor node needs to approve of the transaction for the transaction to be authorized. The set of nodes may use workflow or smart contracts that are stored on the distributed ledger to check to make sure the terms of any transaction conform to established rules of the legal entities.

Because of the hierarchy and rule-based model, the systems and methods described herein may eliminate the need for individual legal entities to maintain their own blockchains or other ledger technologies and allow for a single distributed ledger to store transaction data for transactions between legal entities to be processed and approved. The rules that are stored on the distributed ledger may further enable the legal entities to ensure they can uniquely control the transactions into which they enter despite such transactions being managed by a global authority.

In one embodiment, a system comprises a plurality of nodes each corresponding to a computing device having a processor and memory to store data, wherein each processor is configured to: receive a transaction request from a first node within the plurality of nodes, the transaction request corresponding to a pending transaction between the first node and a second node within the plurality of nodes via a third node within the plurality of nodes, the transaction request comprising a set of transaction attributes, wherein the first node is not in direct communication with the second node; identify a blockchain associated with the pending transaction, the blockchain including a first block instance having a hierarchy file indicating a hierarchy among the first node, the second node, and the third node; in response to the hierarchy file indicating that transaction requests from the first node must be approved by the third node, identify a second block instance having an executable file to approve the transaction request received from the first node; execute the executable file, wherein the executable file is configured to retrieve data from a data source associated with the third node and analyze the retrieved data associated with at least one of the first node, the second node, third node, or the set of transaction attributes to approve or deny the transaction request; and in response to receiving an indication of approval from the executable file, append a third block instance comprising the set of transaction attributes to the blockchain.

In another embodiment, a method comprises: receiving, by a consensus of a plurality of nodes, a transaction request from a first node within the plurality of nodes, the transaction request corresponding to a pending transaction between the first node and a second node within the plurality of nodes via a third node within the plurality of nodes, the transaction request comprising a set of transaction attributes, wherein the first node is not in direct communication with the second node; identifying, by the consensus of the plurality of nodes, a blockchain associated with the pending transaction, the blockchain including a first block instance having a hierarchy file indicating a hierarchy among the first node, the second node, and the third node; in response to the hierarchy file indicating that transaction requests from the first node must be approved by the third node, identifying, by the consensus of the plurality of nodes, a second block instance having an executable file to approve the transaction request received from the first node; executing, by the consensus of the plurality of nodes, the executable file, wherein the executable file is configured to retrieve a data from a data source associated with the third node and analyze data associated with at least one of the first node, the second node, third node, or the set of transaction attributes to approve or deny the transaction request; and in response to receiving an indication of approval from the executable file, appending, by the consensus of the plurality of nodes, a third block instance comprising the set of transaction attributes to the blockchain.

In another embodiment, a method comprises receiving, by a first computing device in communication with a distributed ledger from a computing device associated with a first account, a request to execute a transaction transferring transaction data from the first account to a second account associated with a second computing device in communication with the distributed ledger, the request comprising an identification of the first account and the second account; identifying, by the first computing device, a third account associated with a third computing device in communication with the distributed ledger in response to a hierarchical model indicating for the third account to be involved in a transaction between the first account and the second account; retrieving, by the first computing device, first account data for the first account and third account data for the third account from the distributed ledger; comparing, by the first computing device, a first value from the first account data and a third value from the third account data to a threshold; determining, by the first computing device, the transaction satisfies a transaction policy in response to the first value and the second value exceeding the threshold; and generating, by the first computing device, a record in the distributed ledger indicating the transaction transferring the transaction data from the first account to the second account in response to the determination that the transaction satisfies the transaction policy.

In another embodiment, a system comprises a first computing device comprising a network interface in communication with a computing device associated with a first account, a memory device storing an instance of a distributed ledger, and a processor configured to receive, via the network interface, a request to execute a transaction transferring transaction data from the first account to a second account associated with a second computing device in communication with the distributed ledger, the request comprising an identification of the first account and the second account; identify a third account associated with a third computing device in communication with the distributed ledger in response to a hierarchical model indicating for the third account to be involved in transactions between the first account and the second account; retrieve first account data for the first account and third account data for the third account from the distributed ledger; compare a first value from the first account data and a third value from the third account data to a threshold; determine, by the first computing device, the transaction satisfies a transaction policy in response to the first value and the second value exceeding the threshold; and generate a record in the distributed ledger indicating the transaction transferring the transaction data from the first account to the second account in response to the determination that the transaction satisfies the transaction policy.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification, illustrate an embodiment of the invention, and together with the specification, explain the invention.

DETAILED DESCRIPTION

Figure 1:
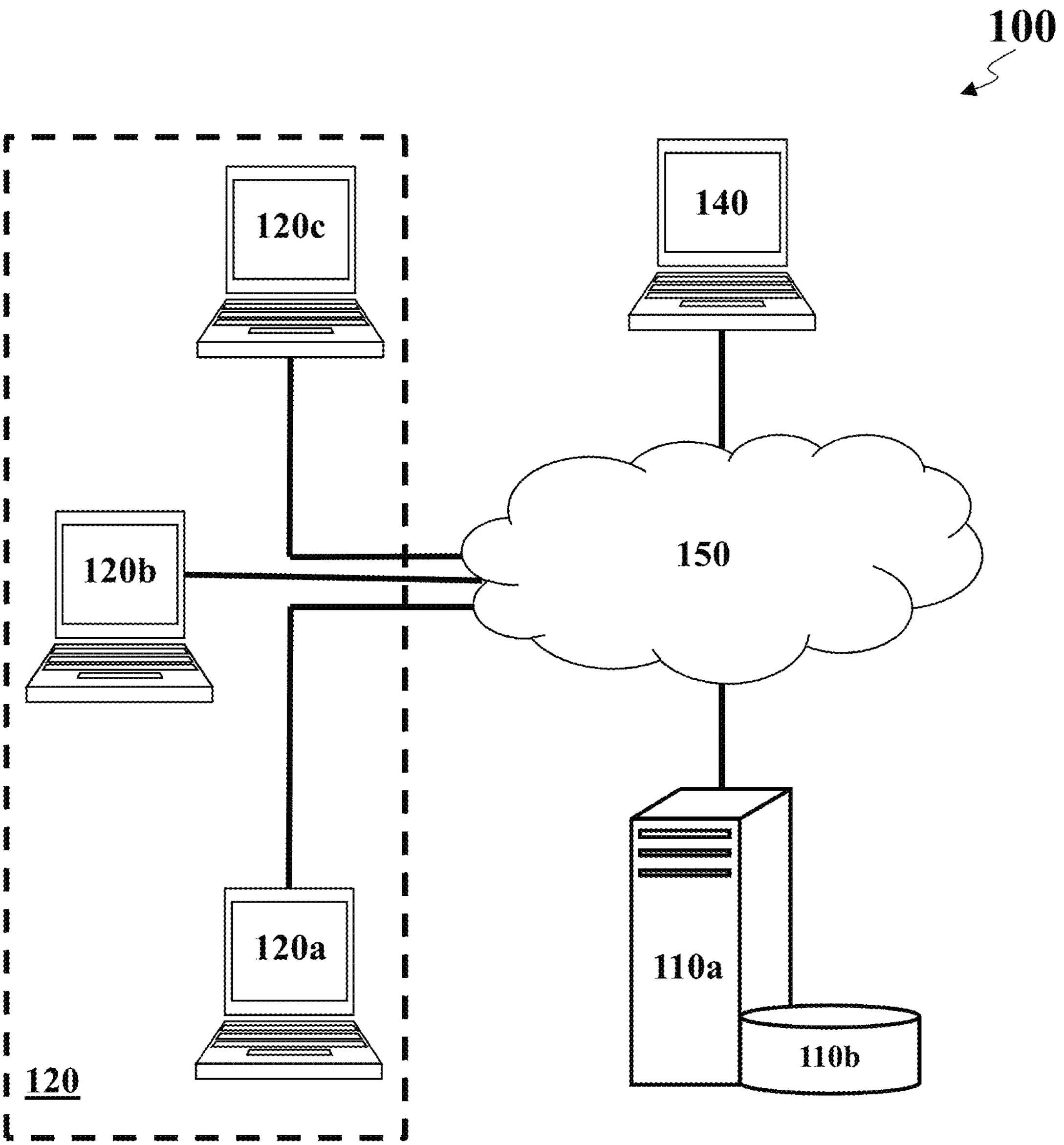
FIG. 1 illustrates implementation of a hierarchy-based blockchain system, according to an embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

FIG. 1 illustrates components of a hierarchy-based blockchain system 100, according to an embodiment. The system 100 may comprise an analytics server 110*a*, a system database 110*b*, distributed peer nodes 120*a-c* (hereinafter referred to as peer nodes 120 or peer node 120), a client device 140, and a network 150. Aspects of the system 100 may be configured to employ and manage a system blockchain, sometimes referred to in the art as a "distributed ledger," and may include blockchain-based distributed ledger software (e.g., Hyperledger, Ethereum, Openchain, and TerraLedger). The systems and methods described herein may be used with blockchain and/or with any other distributed ledger system (e.g., hashgraph, DAG, Holochain, Tempo (Radix), etc.). Network 150 may be any synchronous or asynchronous network. The system blockchain may operate as a distributed database that stores data records associated with users and transactions between peer nodes 120, where the data records stored on the system blockchain may be blocks of data (e.g., block instances or blocks) that are hosted (e.g., locally stored or otherwise in possession of each distributed, such as being remotely hosted or hosted in a cloud) on distributed peer nodes 120. The system database **110*b* may also store records associated with transactions between peer nodes 120. Data stored in records within system databases 110*b* may vary from the data stored in blocks of the system blockchain hosted on peer nodes 120. Furthermore, each block instance may not be accessible to other peer nodes 120, however all block instances may be accessed by the analytics server 110*a* and/or may be stored in the system database 110*b*. In some embodiments, the analytics server 110*a* may generate a duplicate of one or more block instances within the blockchain and store said block instances in the system database 110*b***.

While the analytics server **110*a* may dictate accessibility and transmit instructions to other parties within system 100, each peer node within the distributed peer nodes 120 (e.g., creators of the block instance) or the client (via the client device 140) may prevent others within the system 100 from accessing at least portions of the data within one or more block instances. For example, while generating a block instance, a peer node 120 may encrypt a portion of the block instance so one or more peer nodes 120 may be unable to access the encrypted portion. Peer nodes 120 of a transaction may encrypt transaction data of a block instance so entities that were not privy to the transaction may not be able to view or access the transaction details. Consequently, only the peer nodes 120** that were privy to the transaction may access the data (e.g., by using their respective PKI key).

The analytics server **110*a* may be any computing device comprising a processor and non-transitory machine-readable storage capable of executing the various tasks and processes described herein. Non-limiting examples of such computing devices may include workstation computers, laptop computers, server computers, laptop computers, and the like. In some embodiments, the analytics server 110*a* may be or include one or more peer nodes of peer nodes 120 that maintain the system blockchain. The analytics server 110*a* may generate and display a user interface on the client device 140. An example of a user interface generated and hosted by the analytics server 110*a* may be a website. The analytics server 110*a*** may host a website accessible to end-users, where the content presented via the various webpages may be controlled based upon end-users' accounts and/or account permissions.

While the system 100 includes a single analytics server **110*a*, in some configurations, the analytics server 110*a*** may include any number of computing devices operating in a distributed computing environment.

The analytics server **110*a* may execute software applications configured to display the user interface (e.g., host a website), which may generate and serve various webpages to the client device 140 or each peer node of the distributed peer nodes 120. The website may be used to generate and access data stored on the system database 110*b* or a blockchain hosted by nodes 120. In some implementations, the analytics server 110*a* may be configured to require user authentication based upon a set of user authorization credentials (e.g., username, password, biometrics, cryptographic certificate, and the like). Such authorization credentials may correspond to a peer node account or a user account that is otherwise associated with a peer node 120. In such implementations, the analytics server 110*a* may access the system database 110*b*, which may be configured to store user credentials. The analytics server 110*a*** may be configured to reference the stored user credentials to determine whether a set of entered credentials (purportedly authenticating the user) match an appropriate stored set of credentials that identify and authenticate the user.

The system database **110*b* can be a dynamic database that includes transaction records that the system database 110*b* receives from the peer nodes 120 and from various other sources (e.g., data source providers). The system database 110*b* can be a graph database, MySQL, Oracle, Microsoft SQL, PostgreSql, DB2, document store, search engine, key-value store, etc. The system database 110*b* may be configured to hold any amount of data and can be made up of any number of components. Transaction records stored in the system database 110*b* may comprise one or more data fields (e.g., attributes and/or attribute values) containing transaction-identifying hash values generated by the analytic server 110*a* according to a hashing algorithm implemented by the peer nodes 120. When a new transaction record containing a machine-readable computer file (e.g., PDF, DOC, XSL), is received, the analytic server 110*a* may store the new transaction record in the system database 110*b*. The analytic server 110*a* may also generate a hash value for the new transaction record and store the hash value in the system database 110*b*. The hash value may be a unique identifier for the particular transaction record and may be used by various computing devices of the system 100, such as the system database 110*b*, to reference the computer file or metadata describing the computer file. The computer file may be stored in the system database 110*b* and/or on a block instance of the system blockchain that is hosted on peer nodes 120**.

In some embodiments, the system database **110*b* may include a hierarchy file indicating a hierarchy of the different nodes of the system 100. The hierarchy file may include information indicating which nodes are at which tier of the hierarchy and the rules associated with each tier (e.g., the number of nodes of each tier that must approve the transaction for the respective tier to authorize a transaction). The hierarchy file may also include indications of the transaction attributes that are relevant to each tier (e.g., the transaction attributes that the peer nodes 120** may provide to nodes of the tier to authorize a transaction). As described herein, a similar hierarchy file may be stored on the system blockchain.

The system database **110*b* may be hosted on any number of computing devices comprising a non-transitory machine-readable storage medium and may be capable of performing the various tasks described herein. The system database 110*b* may be accessed by the peer nodes 120 via the network 150**.

Peer nodes 120 may represent one or more institutions under the same corporate umbrella (e.g., each peer node 120 may be a computing device or group of computing devices of an affiliate of the same company), entities that are associated with the corporate umbrella, and/or entities that are outside of the corporate umbrella. For example, the peer nodes 120 may be computing devices that are owned by corporations that are under different corporate umbrellas. Such peer nodes may maintain a distributed ledger, such as a blockchain, to maintain a golden record of the transactions that the different corporations complete between each other. Thus, the peer nodes 120 may not need to store data on their own distributed ledgers and may avoid the potential for the different corporations to store conflicting data about the transactions that they perform between each other. Peer nodes 120 may represent any group of computing devices (e.g., any group of computing devices that perform transactions with each other and maintain a blockchain for such transactions).

Each peer node 120 may have its own status within the corporate umbrella or may be outside of the corporate umbrella altogether (e.g., investor nodes may not be under the corporate umbrella of different custodian nodes or issuer nodes). For example, as is described in more detail with respect to FIG. 3, peer nodes 120 may be investor nodes, broker dealer nodes, prime dealer nodes, global custodians, sub-custodians, central security depository nodes, etc. A peer node 120 may be any computing device comprising a processor and a non-transitory machine-readable storage medium capable of performing the various tasks and processes described herein. Non-limiting examples of a peer node may be a workstation computer, laptop computer, tablet computer, and server computer. Although three peer nodes are shown, any number of peer nodes may be utilized. Although the peer nodes 120 are described as storing blocks of the blockchain in FIG. 1, other computing devices, such as the analytics server 110*a*, may host blocks of the blockchain or host a corresponding blockchain. Each peer node 120 may locally store an instance of the system blockchain in the storage medium of the system blockchain, and may further execute a software application that instructs the peer node 120 to generate and query blocks within the locally stored blockchain instance as described herein.

In some embodiments, the analytics server 110*a* may generate and host webpages for a client device 140. The client device 140 may be one or more computing devices that can access such webpages by signing into accounts that are associated with individual peer nodes 120. The client device 140 may be any type of computing device. The analytics server 110*a* may generate webpages based upon a peer node's 120 role within the system 100 (e.g., investor, global custodian, broker dealer, prime broker, global custodian, sub-custodian, CSD, or issuer). For example, the analytics server 110*a* may identify the account of a peer node 120 (e.g., an account being accessed by the client device) that has logged into the system to initiate a transaction or view the attributes of the transaction. The analytics server 110*a* may select a user interface to present to the node based on the account characteristics that indicate the type or role of the peer node 120. For instance, the analytics server 110*a* may generate a user interface that allows investor nodes to initiate transactions, a user interface that allows custodian nodes to maintain or approve transactions, a user interface that enables issuers to provide securities for sale or to view potential transactions initiated by investor nodes, etc. In such implementations, the characteristics identifying each node's role may be defined by data fields and input fields in account records stored in the system database 110*b*. The analytics server 110*a* may authenticate an account and identify the account's role by executing an access directory protocol (e.g. LDAP). The analytics server 110*a* may generate webpage content, access or generate data stored in the system database 110*b*, and access or generate data stored in the blockchain instances, according to the account's role defined by the account record in the system database 110*b*.

In operation, in some embodiments, a user at the client device 140 may provide an input into a user interface generated by the analytics server 110*a* to initiate a transaction between a first and second peer node 120. The transaction may be a security purchase or a bond purchase and have various attributes (e.g., transaction type (e.g., securities purchase, bond purchase, etc.), initiation date, amount, transacting peer, currency, etc.). Upon receiving the transaction by the client device 140 for the first peer node 120, the analytics server 110*a* may forward the transaction request to the other peer nodes 120. For example, the client device 140 may initiate, via a user interface, a transaction between an investor node and an issuer node by logging into an account associated with the investor node and providing an input that causes the investor node to purchase an asset such as a bond or a number of shares that were issued by the issuer node. The client device 140 may input the transaction attributes of the transaction into the user interface and the analytics server 110*a* may forward the transaction request to one or more prime broker nodes and/or one or more global custodian nodes of the peer nodes 120 (e.g., a third peer node 120) for processing. The analytics server 110*a* may forward the transaction request to any number of peer nodes 120 except for, in some cases, the second peer node 120 (e.g., the issuer node). In some cases, the analytics server 110*a* may forward the transaction request to a consensus of the peer nodes 120. The network may allow this transaction to be broadcast to all relevant nodes (e.g., nodes of the transaction and/or nodes that are verifying the transaction) simultaneously or sequentially, depending on network configuration.

The consensus of the peer nodes 120 may receive the transaction request and identify a blockchain that they maintain and that is associated with the first peer node 120, the second peer node 120, and the third peer node 120. The consensus may identify a block instance from the blockchain that stores a hierarchy file. The hierarchy file may indicate different tiers and/or groups of peer nodes 120 including a hierarchy among the first peer node, the second peer node, and/or the third peer node. For example, the hierarchy file may indicate that the first peer node is an investor peer node 120 at the bottom of the hierarchy and the second peer node is an issuer peer node at the top of the hierarchy. The hierarchy file may indicate that the third peer node 120 is a global custodian peer node among multiple global custodian peer nodes 120 that are on an upper tier of the hierarchy.

The hierarchy file may indicate that the global custodian peer nodes 120 that are on the upper tier of the hierarchy must approve any transaction that is initiated by the first peer node 120. Accordingly, the consensus of the plurality of nodes may identify a block instance that stores files or that is otherwise associated with the global custodian peer nodes 120 on the system blockchain. The block instance may be or include a smart contract that, upon execution, causes the consensus to retrieve data from a data source (e.g., a blockchain or a central database) associated with the global custodian peer nodes 120 that includes one or more rules indicating which transactions to allow and/or decline. The consensus of the peer nodes 120 may provide the global custodian nodes with transaction attributes that correspond to the custodian nodes. Each of the global custodian peer nodes 120 may compare the transaction attributes of the transaction to the rules and, responsive to one of the rules being satisfied, transmit indications to the plurality of nodes to indicate their approval. However, responsive to a custodian peer node 120 determining none of the rules are satisfied, the custodian peer node 120 may send back an indication that it does not approve of the transaction. The consensus of the peer nodes 120 may maintain a count for each custodian peer node 120 that transmits an indication authorizing the transaction.

The consensus of the peer nodes 120 may determine whether a quorum of the custodian peer nodes 120 has approved of the transaction by comparing the count to a user set threshold. Upon determining the count exceeds the threshold, the consensus of the peer nodes 120 may determine the custodian peer nodes 120 have approved of the transaction and transmit a signal to the second peer node 120 indicating the transaction was approved by the custodian peer nodes 120.

The second peer node 120 may receive the indication and determine whether to approve of the transaction. The second peer node 120 may do so based on its own set rules or based on a user input. Upon the second peer node 120 approving the transaction, the second peer node 120 may transmit a signal to the consensus of the peer nodes 120 indicating the approval, and the consensus of the peer nodes 120 may append a block instance to the system blockchain indicating the transaction attributes and other data associated with the transaction (e.g., timestamp data, the peer nodes involved in the transaction, the votes of the global custodian peer nodes 120, etc.). In some embodiments, the second peer node 120 and/or the consensus may transmit a signal to the analytic server 110*a* indicating the approval and the transaction attributes of the transaction. The analytic server 110*a* may store transaction data in the system database 110*b* as a record to maintain a record of the transaction off-blockchain for added security such as to have data to compare against the system blockchain to check if the system blockchain was compromised.

When appending block instances to the system blockchain, the peer nodes 120 may generate block addresses for data to be retrieved from the respective blockchain. To do so, the peer nodes 120 may generate a hash value for the transaction record of the block instance, where the hash value or other identifier values may be a block address to reference the block instance within the blockchain. The peer nodes 120*a-c* may generate the hash value for the transaction record by generating a hash based on the transaction record (e.g., based on all or a portion of the data of the transaction record) and the data of the immediately preceding block data or block address. This block address may then be stored into the system database 110*b* in a document record along with the transaction record and any number of additional data field entries related to the transaction record.

In operation, the analytics server 110*a* or peer nodes 120 may reference the block of the blockchain containing the file according to the block address. The analytics server 110*a* or peer nodes 120 may generate additional blocks and corresponding block addresses on the system blockchain in a similar manner (e.g., generating a hash value for a block containing user data and then generating a new block address using the block address of the preceding block). Block addresses may be generated in any number of combinations of hashed block data and/or hashed block addresses from the new block and one or more preceding blocks, such that the address of the new block is dependent upon, or otherwise linked to, at least the immediately preceding block.

In some embodiments, a peer node 120 may generate new blocks on a locally stored instance of the system blockchain according to data received from the analytics server 110*a* or other peer nodes 120. The analytic server 110*a* may query the block instances of the system blockchain according to a block address stored in the system database 110*b*. When the analytics server 110*a* executes the query of the blocks on the system blockchain, the analytics server 110*a* may poll the peer nodes 120 to determine the most recent data on the system blockchain (e.g., latest valid blockchain).

In some embodiments, the analytics server 110*a* (or peer nodes 120) may ensure that the data of the system blockchain is accurate according to a voting mechanism encoded within the blockchain software executed by the peer nodes 120. Each peer node 120 may receive a query for the block instance and block address, and return a response to the analytics server 110*a* indicating whether the block address contains the same data. The analytics server 110*a* may select this method to combat possible fraud and to be certain that data in the blockchain is resistant to corruption, as each block instance on a quorum or consensus of the peer nodes 120 would need to be corrupted in the same way for a possible security breach. In this way, the analytics server 110*a* may also be prevented from acting on obsolete data. For instance, a peer node 120 may attempt to modify information about a particular transaction. By modifying the information within the block instance, the hash value of said block instance may change, which would result in the block instance being disconnected from other block instances within the blockchain. Furthermore, when queried, other peer nodes 120 may indicate that the modified block instance does not match a version of the data stored on their respective nodes. As a result, the analytics server 110*a* may determine that the modified block instance has been indeed tampered with. The peer nodes 120 may then refuse to use the modified block instance.

As described above, the process performed by the peer nodes 120 may be performed by a consensus of the peer nodes 120. A consensus may be a majority, all, or a number above a predetermined threshold (which may be set and be adjusted by an administrator). The peer nodes 120 may each perform the process to verify the validity of a transaction between peer nodes 120. In some embodiments, different nodes of the consensus may perform different steps of the process. Responsive to a consensus of the peer nodes 120 receiving an indication of approval of a transaction request, the consensus may append a block instance for the respective transaction to the blockchain maintained by the peer nodes 120. In some cases, peer nodes 120 may in turn append block instances to blockchains maintained internally by the respective peer nodes 120. Because the peer nodes 120 may append a block instance to the blockchain using the hierarchy-based method, the peer nodes may append the block instance to the blockchain without requiring a quorum, substantially lowering the required resources to maintain the blockchain.

Figure 2:
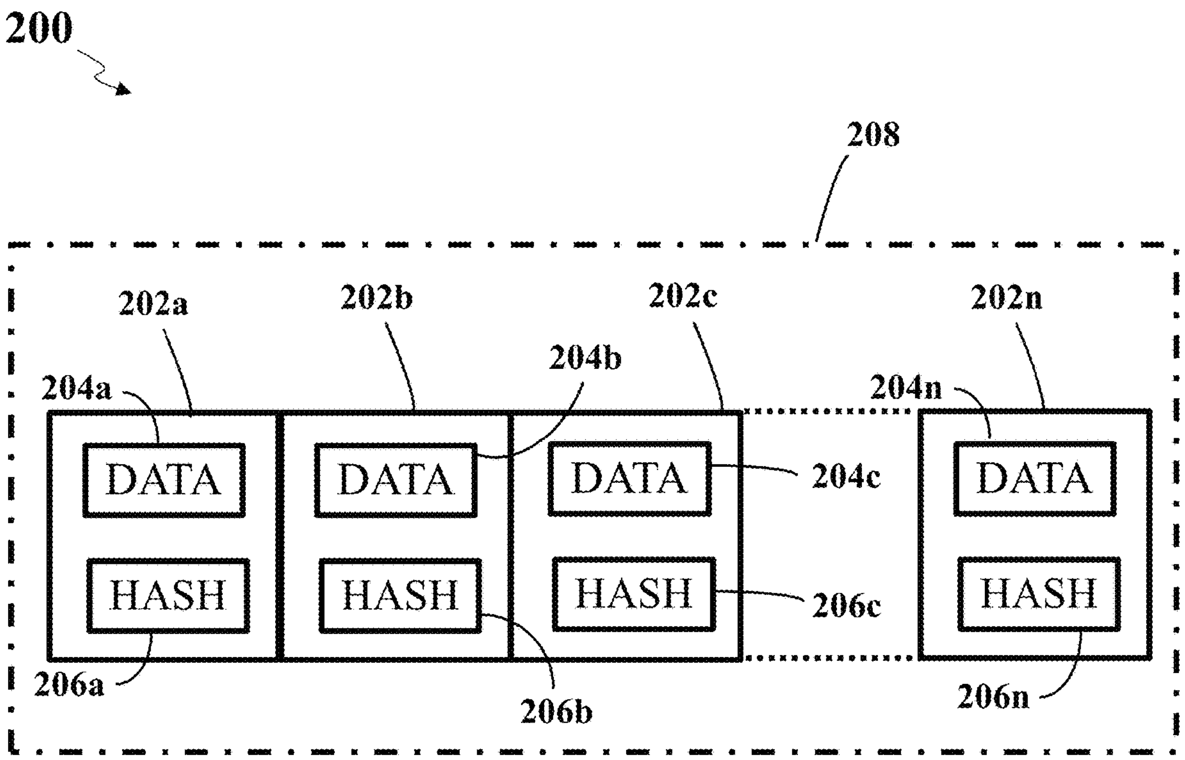
FIG. 2 illustrates appending block instances to a blockchain, according to an embodiment.

Referring now to FIG. 2, a non-limiting example of appending block instances to a blockchain comprising different block instances is illustrated. As depicted in FIG. 2, a blockchain 208 comprising block instances 202*a*-202*n* (collectively 202) may include data 204*a*-204*n* (collectively 204) that enables information, such as transaction data, hierarchical data (e.g., a hierarchy file indicating a node hierarchy of the blockchain), smart contract data, machine-readable code/documents, and other metadata associated with one or more transactions of the peer nodes described above. The block instances 202 may also contain hash values 206*a*-206*n* (collectively 206) that are used to link each of the block instances to the preceding block instance, as understood in the art.

Peer nodes may generate (or instruct a blockchain service to generate) the block instance 202*a* (e.g., the genesis block). The peer nodes may receive data 204*a* from a first peer node or a first computing device via a GUI provided by an analytic server on the first computing device or peer node. For example, an administrator using the first computing device may log in to a website hosted or otherwise associated/managed by the analytic server and transmit data 204*b* (e.g., a transaction record) to other peer nodes. The peer nodes may verify the data 204*b* against data of a corresponding transaction record. Responsive to determining the data matches, the peer nodes may generate a block instance for the blockchain that they maintain. Upon generation of the block instance 202*b*, the peer nodes may generate the hash value 206*b* based on the data 204*b* (and/or data of the immediately previous block instance), an identifier of the first computing device, and/or other identifier information (e.g., time stamp and/or geolocation information). The identification information may be used as a veracity scale factor that the information is true and accurate.

The peer nodes may generate (or instruct a blockchain service to generate) the block instance 202*c*. The peer nodes may receive data 204*c* from a second computing device (e.g., a second peer node) via a GUI provided by the analytic server on the second computing device. For example, an administrator using the second computing device may log in to a website hosted or otherwise managed by the analytic server and the second computing device may transmit data 204*c* to the peer nodes. The peer nodes may generate a hash value 206*c* based on the data 204*c* and other information as described above.

The hash value 206*c* may be based on the hash value 206*b* and/or the data 204*c*. The peer nodes may incorporate the hash value 206*b* into the hash value 206*c* to append the block instance 202*c* to the block instance 202*b*. The peer nodes may subsequently poll all the peer nodes to ensure the highest integrity of the blockchain by appending the latest block instance to the latest valid blockchain instances (e.g., the last blockchain for which there was a quorum). Using this method, block instances within the blockchain 208 may be appended to the preceding block instance. The peer nodes may generate block instances 202*c-n* using the same methods explained above to continuously update the blockchain 208. As depicted, block instances 202*a*, 202*b*, 202*c*, and 202*n* are connected because of synchronization of hash values 206*a*, 206*b*, 206*c*, and 206*n*.

Modification of data within a block instance may disconnect that block instance from the blockchain. The peer nodes may use this method to combat possible fraud or unauthorized modification of the data within blockchain instances. For example, if the second administrator using the second computing device modifies data 204*b* within block instance 202*b*, the hash value 206*b* will also be modified. As explained above the hash value 206*b* may be based on (or at least partially based on) data 204*b*; therefore if data 204*b* is modified, hash value 206*b* will also be modified. Modification of the data 204*b* or the hash value 206*c* may break the link between block instance 202*b* and block instance 202*c* because hash value 206*c* is at least in part generated based on hash value 206*b*.

Figure 3:
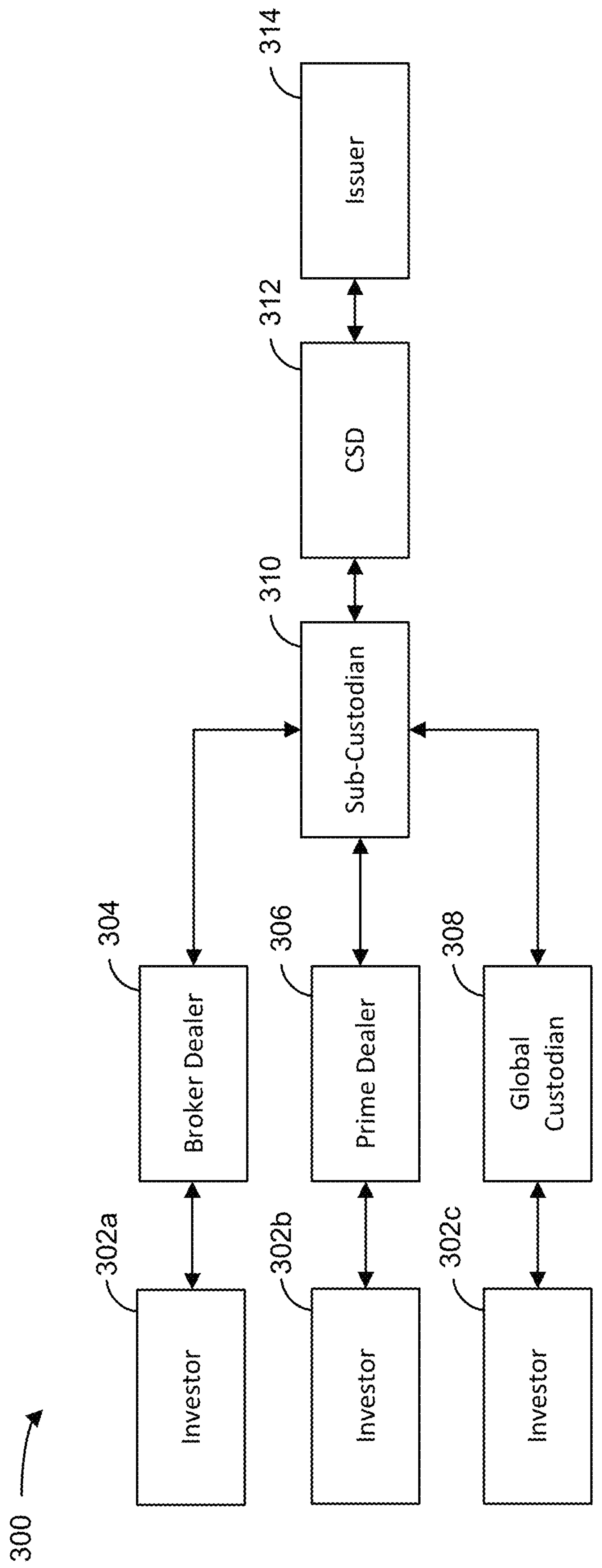
FIG. 3 illustrates node hierarchy of a hierarchy-based blockchain system, according to an embodiment.

FIG. 3 illustrates a non-limiting example of a node hierarchy (e.g., node hierarchy 300). The node hierarchy 300 may be an example hierarchy showing communicative relationships between a plurality of nodes of a hierarchy-based blockchain system. Node hierarchy 300 may include investors 302*a-c* (hereinafter referred to as investors 302 or investor 302), broker dealer 304, prime dealer 306, global custodian 308, sub-custodian 310, central securities depository (CSD) 312, and issuer 314, in some embodiments. Node hierarchies may include any number of nodes or different types of entities. An investor 302 may be or include a node that initiates a transaction by purchasing an asset such as a bond or stock. A broker dealer 304 may be or include a node that executes transactions for assets. In some instances, a broker dealer 304 may hold or store assets themselves. A prime dealer 306 may be or include a node that executes transactions but provides custody for investors 302.

A global custodian 308 may be or include a node that provides portfolio custody services for clients in multiple markets or across different blockchain environments. A sub-custodian 310 may be or include a node that is the legal owner of an asset. A sub-custodian may hold or store assets on behalf of clients such as investors 302. CSD 312 may be or include a node that stores and/or maintains a register of the owners of assets on behalf of one or more issuers 314. Issuer 314 may be or include a node from which investors 302 purchase assets. Each entity of node hierarchy 300 may be or include a separate node that may communicate with other nodes within node hierarchy 300, as illustrated. Node hierarchies may be organized in any fashion.

Various parties shown in the node hierarchy 300 may belong to different entities and may utilize different computing devices to interact with the same blockchain. As discussed herein, these parties may have competing and/or conflicting interests. Therefore, data generated by different parties may not be treated equally. A single blockchain may be configured using the methods described herein, such that the investor 302*a* and the sub-custodian 310 can add data to the blockchain using different blockchain consensus. That is, the blockchain is configured to use different protocols for adding data based on a node's position within the node hierarchy 300. The node hierarchy 300 may be revised by a system administrator.

Figure 4:
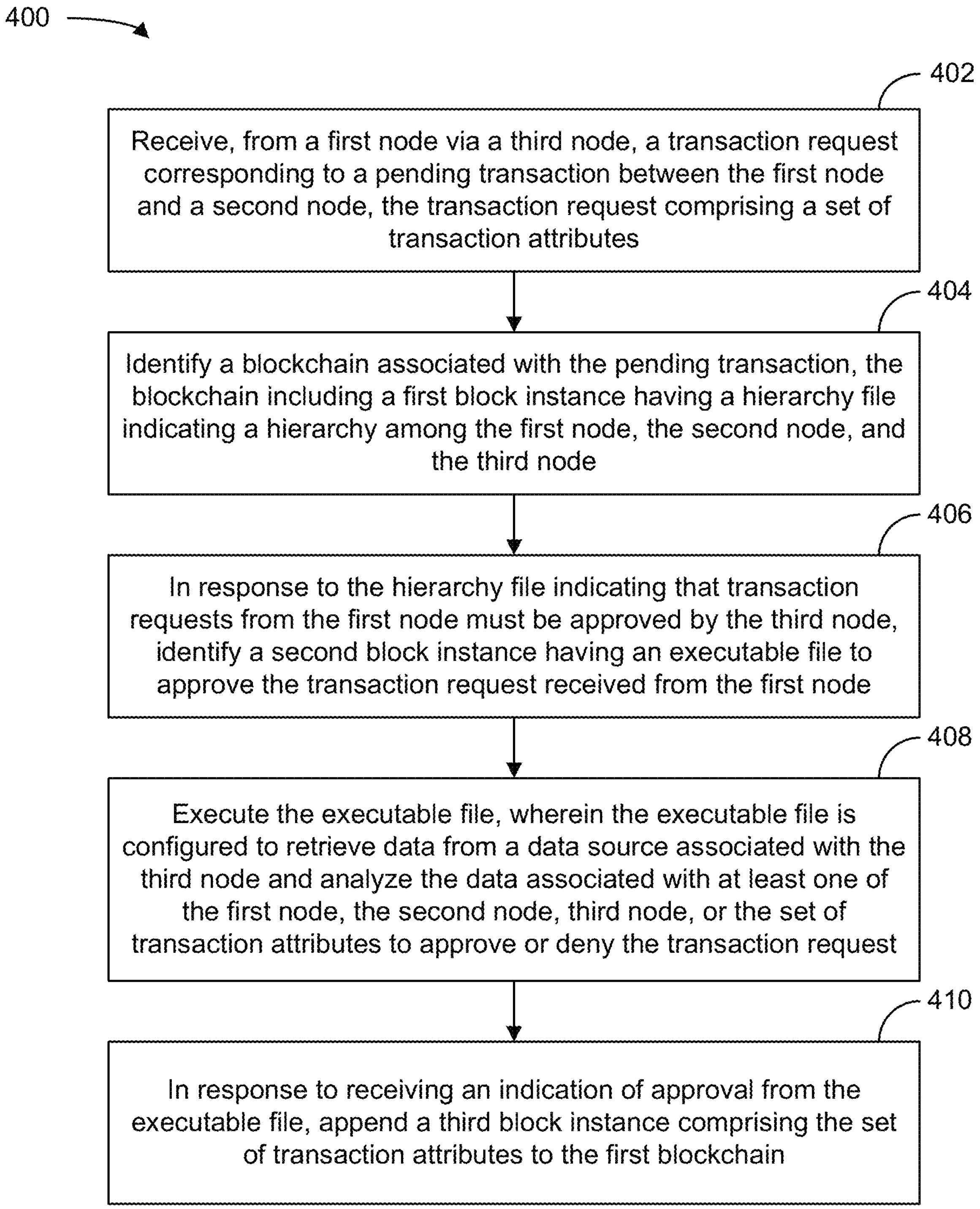
FIG. 4 illustrates a flowchart depicting operational steps for implementing a hierarchy-based blockchain system, according to an embodiment.

FIG. 4 illustrates execution of a method 400 for implementing a hierarchy-based blockchain, according to an embodiment. Other embodiments may comprise additional or alternative steps, or may omit some steps altogether. Each of the steps of the method 400 may be performed (in some cases separately) by one or a combination of a server and/or any of a plurality of nodes that maintain a blockchain.

At step 402, a consensus of a plurality of nodes may receive, from a first node, a transaction request to initiate a pending transaction between the first node and a second node of the plurality of nodes. The transaction request may include transaction attributes (e.g., amount, time, parties to the transaction, etc.) for a potential transaction between the first node and the second node such as a bond purchase or a purchase of shares. As explained above, a server associated with the plurality of nodes may generate a graphical user interface to provide transaction record services to the first node. In an embodiment, the graphical user interface may be a website hosted by a server or one of the peer nodes, which may be available to each of the plurality of nodes. The purpose of said website may be to collect transaction data such as data in transaction records, and to provide a platform to securely upload transaction data, and/or to possibly retrieve transaction data from the peer nodes.

The graphical user interface may act as an intermediary between different nodes involved in a transaction and may be a central and "one-stop" website for facilitating transactions between peer nodes, storing data of the transactions, and/or retrieving such data. While the described graphical user interface is described herein as a central management tool, neither the peer nodes nor the graphical user interface deviate from the spirit of the distributed nature of the blockchain technology. The peer nodes may provide the management tool to reduce the computational burden of keeping record within different and unrelated databases. Blockchain and block instances may be stored in individual peer node databases.

The different nodes of the plurality of nodes may have different types of accounts for the website. Types of accounts may be, for example, investor, broker dealer, prime broker, global custodian, sub-custodian, central security depositories (e.g., securities databases), and/or asset issuer. As described above, each type of account may have different responsibilities for managing transactions that are executed and maintained on the blockchain and/or be responsible for verifying different transaction attributes. In some instances, the different types of accounts may be dedicated to different types of assets or perform different functions when facilitating transactions between nodes that maintain the blockchain.

A third node of the plurality of nodes (e.g., a global custodian or a prime broker) may be dedicated to verifying or enabling transactions between nodes of the plurality of nodes. The third node may receive the transaction request from the first node, in some cases via a private communications channel the third node shares with the first node. The third node may receive and forward the request to other nodes of the plurality of nodes to determine whether to authorize the transaction. In some embodiments, the third node may send a prompt to the second node to indicate the first node is initiating a transaction and the terms of the transaction. Consequently, the first node may initiate a transaction with the second node without any direct communication with the first node, enabling the third node to facilitate whether to allow the transaction to be authorized.

For example, an investor node may submit a transaction request to initiate a bond purchase from a custodian node. The custodian node may forward the request to other nodes that manage the blockchain and send a prompt indicating the transaction request and its transaction attributes to the issuer node that issued the bond.

Upon receiving the transaction request, at step 404, the consensus of the plurality of nodes may identify a blockchain that is associated with the pending request. The blockchain may be a blockchain that is maintained by the plurality of nodes including, for example, the first node, the second node, and/or the third node. The blockchain may include transaction data of transactions that are processed between the nodes that maintain the blockchain and other data associated with the nodes (e.g., smart contracts, geographical location information, rules to allow for transactions to be authorized, financial data, etc.).

The blockchain may include a block instance that contains a hierarchy file. The hierarchy file may include a hierarchy of the nodes of the plurality of nodes with tiers that indicate permissions that are required for different nodes to append block instances to the blockchain. The data structure of the hierarchy file may be an organized list of the different nodes and their tiers, tags associated with the nodes indicating their tiers, various rules identifying the different devices within the tiers, etc. The nodes may be represented in the hierarchy by various identifiers (e.g., device identifiers, account identifiers, group entity identifiers, or any other type of identifier). For example, in one embodiment, the hierarchy file may include two tiers. A node in the bottom tier may require permission from a quorum or a predetermined number of nodes of the top tier for a transaction to be authorized. For instance, an investor node may be in the bottom tier of the hierarchy and prime broker nodes may be in the top tier. When the investor node initiates a transaction with an issuer node (which may also be in the top tier), the investor node may need permissions from a quorum of the prime broker and/or custodian nodes for the transaction to be allowed and for the consensus to append a block instance for the transaction to the blockchain.

The hierarchy may include more than two tiers of peer nodes. For example, a bottom tier may include investor nodes, the next tier may include global custodian nodes, the next tier may include sub-custodian nodes, the next tier may include CSD nodes, and the top tier may include issuer nodes. The hierarchy file may include different rules for the tiers such as a majority of the global custodian nodes must approve the transaction while only one of the sub-custodian nodes must approve the transaction for the transaction to be allowed. The nodes of each tier may execute smart contracts on the system blockchain or otherwise analyze data retrieved from execution of the smart contract to determine whether the terms of the transaction comply with their associated rules and therefore determine whether to approve of the transaction. The hierarchy file may include any number of rules or tiers.

The hierarchy file may include rules that indicate which tiers of the hierarchy for the consensus of the plurality of nodes to identify. The rules may be associated with different transaction attributes that are associated with the individual tiers. For example, the hierarchy file may include rules where transactions that are initiated at specific times may be verified by a specific tier of the hierarchy or transactions that have specific transaction attributes (e.g., transaction type, amount, etc.) may be verified by a specific tier of the hierarchy. In some embodiments, nodes of individual tiers of the hierarchy may only add specific types of data to the blockchain. The hierarchy file may include any number or type of such rules.

The consensus of the plurality of nodes may identify the tiers of the nodes that are involved in the potential transaction (e.g., the first node, the second node, and/or the third node). The consensus may identify the identifiers for the first node, second node, and/or the third node and determine the tier of each node. Based on the third node having a higher tier than the first and/or second node, the consensus may determine that the third node or a quorum of nodes on the same tier as the third node needs to approve the transaction request for the transaction to be authorized.

In response to the hierarchy file indicating that transaction requests from the first node must be approved by the third node, at step 406, the consensus may identify a second block instance that has an executable file that is configured to approve transaction requests received from the first node. The consensus may identify the second block instance based on an identifier contained within the second block instance that indicates the block instance comprises data associated with the third node. The executable file may be a smart contract that is associated with the third node. The smart contract may be configured to retrieve data from a data source (e.g., a database or a blockchain) of the third node. The consensus may execute the executable file by inputting the set of transaction attributes into the executable along with identifiers of the first and/or second nodes.

At step 408, upon execution, the executable file may cause the third node or the consensus of nodes to retrieve data (e.g., a document, a machine-readable file, etc.) from the data source associated with the third node. The retrieved data may include financial data about the first, second, or third nodes, sets of rules that correspond to the nodes, workflow management data, etc. The executable file may retrieve such data and evaluate the transaction attributes included in the transaction request against the data. The executable file may determine whether the transaction attributes satisfy the rules to determine whether to approve the transaction request.

For example, the data may include a series of rules. The series of rules may correspond to the first node. Examples of such rules may include automatically accepting any transaction requests from the first node, a requirement that a user at the third node review and manually approve transactions from the first node, only accepting transactions from the first node that have attributes that fall within specific ranges (e.g., transactions that have values between 1000 and 4000), only accepting transactions for which the first node has enough money on-hand to make the purchase, etc. Similarly, the data may include a series of rules that correspond to the second and/or third node. For example, the third node and/or the second node may be associated with rules that only allow transactions with a value less than a threshold to be authorized. The second node may be associated with rules that only allow a predefined number of shares to be purchased at once. The third node and/or the second node may be associated with any number of rules. The executable file may retrieve such rules and/or data about the first node and compare the two to determine whether to approve the transaction.

Each tier of nodes may be associated with different attributes of a transaction and rules associated with the particular attributes. For example, the sub-custodians may be associated with different transaction attributes than prime brokers and have rules that are associated with the specific attributes. Such attributes may be designated in a file stored on the system blockchain or in a system database such as in a hierarchy file. Upon initiating a transaction, the consensus of the plurality of nodes may identify transaction attributes of the transaction that correspond to each of the tiers of the hierarchy. The consensus may only provide the corresponding transaction attributes to the nodes of the respective tiers. In turn, the nodes may compare the corresponding transaction attributes to a set of rules (e.g., input the transaction attributes into a smart contract of the blockchain) to determine if the transaction attributes satisfy their respective rules. Responsive to each tier of nodes determining the transaction attributes satisfies its respective set of rules, the consensus may generate a signal indicating the transaction has been authorized. However, in some embodiments, responsive to a portion of the attributes not satisfying rules of any one of the tiers, the consensus may determine the transaction was not authorized and generate a rejection signal to send back to the peer node that initiated the transaction. Advantageously, by using the hierarchical account structure described herein to authorize transactions, each tier may only view the portions of the transaction that are relevant to the respective tier without gleaning a full view of the transaction, enabling the transaction to remain private between the transacting parties while ensuring the transaction complies with the rules of each party that facilitates the transaction.

The executable file may be configured to allow the transaction to be authorized responsive to determining a consensus of a set of peer nodes (e.g., a set of nodes within the plurality of nodes) has approved the transaction. The set of peer nodes may be identified in the rules or may be specified in the executable file. The consensus of the plurality of nodes may execute the executable file and poll the set of peer nodes asking whether the peer nodes approve of the transaction. The peer nodes may analyze the data associated with the transaction (e.g., any transaction attributes that correspond to the respective tier of the peer nodes) and, in some cases, any rules or data that the executable file has retrieved from the data source. In some embodiments, the peer nodes may retrieve such rules and/or data from the data source. Responsive to determining the transaction data satisfies the retrieved data and/or rules from the data source, the peer nodes may send indications of their approval to the nodes executing the executable file. However, responsive to determining the transaction data does not satisfy the retrieved data and/or rules, the peer nodes may send indications of their disapproval.

The peer nodes may be identified based on their place in the hierarchy. For example, the hierarchy of the hierarchy file may have multiple tiers indicating different nodes' placement within the hierarchy. The executable may identify the set of nodes based on an indication to query the set of nodes that is within the top tier of the hierarchy. The executable may identify the indication and identify the nodes that are associated with the top tier of the hierarchy. In turn, the executable may cause the consensus of the plurality of nodes executing the executable to poll the nodes that are associated with the top tier of the hierarchy asking if they approve of the transaction.

The executable file may determine whether a quorum of the polled set of nodes has provided their approval. The quorum may be a predetermined number or percentage of the polled nodes. The executable file may maintain a counter indicating the number of nodes that have responded with their approval of the transactions, incrementing the counter for each positive response. The executable file may compare the counter to the predetermined number or percentage. Responsive to determining the count of the counter exceeds the predetermined number or percentage, the executable file may determine the transaction has been approved by the set of nodes. The executable file may cause the consensus to prompt the third node to indicate the approval.

Responsive to determining the rules have been satisfied and/or a quorum of the set of nodes has transmitted an approval message to the consensus of the plurality of nodes, the executable file may cause the consensus to prompt the second node asking whether the second node approves or denies the transaction request. The executable may cause the consensus to send a prompt indicating the transaction attributes of the transaction, that the executable file has approved of the transaction, and/or the rules that were satisfied for the approval. The executable may generate the approval request and transmit the generated request to the second node.

The second node may receive the prompt from the executable or the consensus and determine whether to approve of the transaction request. The second node may do so according to its own set of rules (e.g., rules indicating whether the second node can sell to the first node, whether the number of shares falls within an allowed range, whether the purchase price is too high, etc.) or automatically upon receiving the prompt. The second node may determine whether to approve of the transaction request and transmit a signal to the third node indicating its approval or disapproval.

Responsive to receiving the approval from the second node, the executable file may generate an indication of approval for the transaction. The indication of approval may include an indication of identifiers of the first node, second node, and/or third node, indications of the set of transaction attributes, and/or any other characteristics about the transaction. The executable file may transmit or cause a signal to be transmitted to the consensus of the plurality of nodes indicating the generated indication of approval.

At step 410, in response to receiving an indication of approval from the executable file, the consensus may append a third block instance comprising the set of transaction attributes to the blockchain. The approval may be an indication that the requirements of the executable file were satisfied, that a quorum of the peer nodes above the first and/or second nodes approved the transaction, the second node approved the transaction, or any other indication that the transaction was approved. The consensus may receive the approval and append a block instance to the blockchain that is maintained by the plurality of nodes. Advantageously, the consensus may do so without obtaining approval from a quorum of all of the plurality of nodes. Based on the data of the hierarchy file and/or the executable file, the consensus may append the block instance for the transaction to the blockchain-based only on the approval of one or a few of the nodes of the plurality of nodes. Thus, the systems and methods described herein allow for fewer computational resources to be used when approving transactions and appending blocks to a blockchain.

Figure 5:
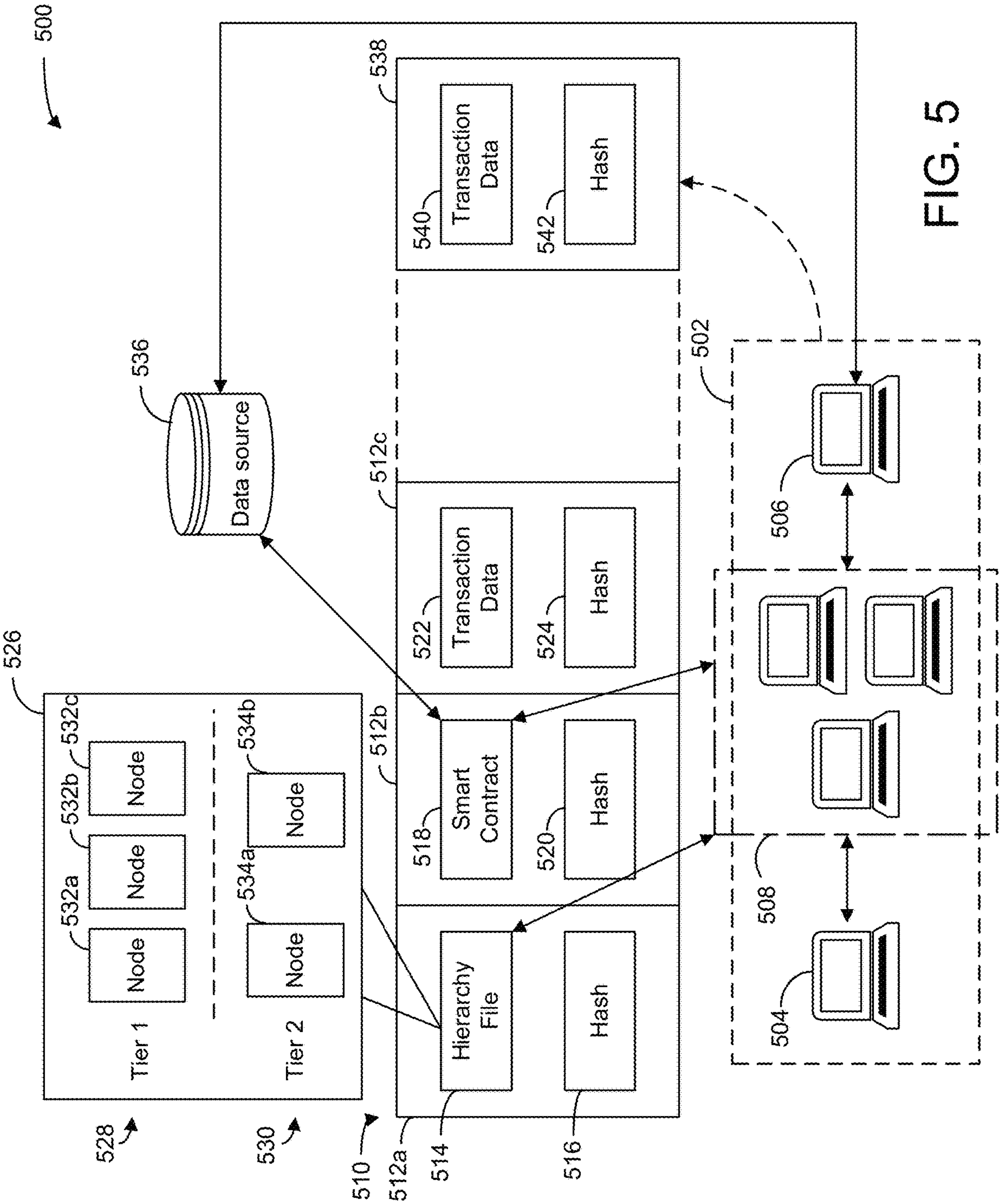
FIG. 5 graphically illustrates implementing a hierarchy-based blockchain system, according to an embodiment.

FIG. 5 visually depicts a non-limiting example of how the methods and systems described herein can be implemented. The sequence 500 may include a plurality of nodes 502 that facilitate a transaction or a purchase of a financial instrument between a first node 504 and a second node 506 of the plurality of nodes 502 without any direct communication between the first node 504 and the second node 506. The first node 504 may transmit a message to a set of nodes 508 (e.g., a consensus of the plurality of nodes 502) of the plurality of nodes 502 indicating a potential transaction with the second node 506. The transaction request may include a set of transaction attributes for the potential transaction such as the purchase price and/or the number of shares that are being purchased.

The set of nodes 508 may identify a blockchain 509 that the set of nodes 508 maintains with the first node 504 and the second node 506. The blockchain 510 may initially comprise a plurality of block instances 512*a-c*. The block instance 512*a* may include a hierarchy file 514 and a hash 516 of the hierarchy file 514 and any other data being stored in the block instance 512*a*. The block instance 512*b* may include a smart contract 518 and a hash 520 of the smart contract 518, other data of the block instance 512*b*, and/or the hash 516. The block instance 512*c* may include transaction data 522 for a transaction between nodes of the plurality of nodes 502 and a hash 524 of the transaction data 522, the hash 520, and any other data stored within the block instance 512*c*.

The set of nodes 508 may receive the transaction request from the first node 504 and identify the hierarchy file 514 from the blockchain 510. The hierarchy file 514 may include a hierarchy 526 of the nodes of the plurality of nodes 502 indicating the permissions each node has and/or the rules for appending block instances to the blockchain 510. The hierarchy 526 may include a first tier 528 and a second tier 530. The first tier 528 may include nodes 532*a-c* for which a quorum must approve of transactions that are initiated by nodes 534*a-b* of the second tier 530. Nodes 532*a-c* and/or nodes 534*a-b* may be nodes of the plurality of nodes 502. For example, according to the hierarchy 526, if the node 534*a* attempts to purchase a financial instrument from another node, a quorum of the nodes 532*a-c* must approve of the transaction for the transaction to be approved. The first node 504 and/or the second node 506 may be associated with or be in the first tier 528 or the second tier 530.

In some embodiments, for the quorum of the nodes 532*a-c* to approve of the transaction, the set of nodes 508 or the nodes 532*a-c* may execute the smart contract 518. By executing the smart contract, the set of nodes 508 or the nodes 532*a-c* may retrieve data from a data source 536. The data source 536 may be maintained or stored by the set of nodes 508 or one or more of the nodes 532*a-c*. The data may include a set of rules indicating which transactions to allow (e.g., which transaction attributes are allowable or which nodes can initiate transactions), account information about the first node 504, account information about the second node 506, etc. The nodes 532*a-c* may compare the transaction attributes of the potential transaction between the first node 504 and the second node 506 and the retrieved data.

Upon a quorum of the nodes 532*a-c* determining the transaction should be allowed (e.g., based on the set of rules), the set of nodes 508 may prompt the first node 504 and/or the second node 506 to indicate the transaction has been allowed and append a block instance 538 to the blockchain 510. The block instance 538 may contain transaction data 540 and/or a hash 542 of the transaction data 540, other data of the block instance 538, and the hash 542 of the previous block instance 512*c*. Thus, the hierarchical structure of the nodes that maintain the blockchain 510 may enable nodes to append block instances to the blockchain 510 based on the hierarchy instead of requiring a quorum of all nodes that maintain the blockchain 510, enabling block instances to be appended using different sets of rules and permissions instead of just based on an agreement between the plurality of nodes 502.

While the systems and methods described herein have been integrated into a blockchain system, the hierarchical model may also be implemented without a blockchain. For example, a processor may store a hierarchy file within memory that indicates the different tiers of different nodes of the hierarchy. Upon receiving a transaction request, the processor can distribute the transaction attributes of the transaction request to the nodes according to the hierarchy and the nodes may determine whether the respective attributes are acceptable or otherwise comply with a set of rules established by the set of nodes. Responsive to each of the nodes determining the transaction attributes satisfy its respective rules, the processor may authorize the transaction. However, responsive to one of the nodes or one of the tiers of nodes determining the respective attributes do not satisfy its respective rules, the processor may not authorize the transaction. Thus, the systems and methods provide for a new method of authorizing transactions between entities using a hierarchical data structure.

In an example, a plurality of nodes may each maintain a database that stores files including various rules that correspond to different transaction attributes. The different nodes may each be associated with specific transaction attributes. A central server may maintain a file that includes a hierarchy indicating the transaction attributes with which the different nodes are associated. Each tier of the hierarchy may be associated with a different set of transaction attributes. When a node initiates a transaction, the server may send the transaction attributes for the transaction to the corresponding nodes. The nodes may compare the received transaction attributes to their stored rules. Responsive to each of the nodes approving or determining the received transaction attributes comply with the node's respective rules, the server may allow for the transaction to go through. However, responsive to one of the nodes determining the transaction attributes do not satisfy the respective node's rules, the node may transmit a signal to the central server and the central server may decline the transaction. In yet another example, for a transaction request, the central server may receive rules from the different nodes and apply the rules to the transaction attributes of the transaction request that correspond to each respective node. Responsive to determining the applied rules are satisfied, the server may enable the transaction. However, responsive to determining at least one of the rules is not satisfied, the central server may stop the transaction.

Centralized Ledger with Common Data Model and Workflow

Today, investors into assets generally rely upon a chain of intermediaries (entities) to execute, settle, and hold those investment transactions. A typical chain of intermediaries may include:

Investor< >Broker< >Global Custodian< >Sub Custodian< >Central Securities Depository An investor may execute a transaction via a computing device accessed by their broker. The transaction instruction may then flow through computing devices accessed by the investor's global custodian, then the global custodian's appointed sub-custodian, and then into a central securities depository where the transaction settles and may be safe kept in an account belonging to the sub-custodian. The entitlement to this asset is indicated via a contractual chain of custody reflecting the above and recorded in ledgers maintained by each entity. Each of the entities operate their own ledgers (e.g., static databases or internal distributed ledgers for each of the entities) to define ownership of the assets on their books. The entities send messages (in the form of transaction instructions or position statements) to each other to update the ledgers to reflect transactions as they pass through the linear and sequential chain of custody, and those transactions are managed independently by each actor in the chain. This structure may result in data related to each transaction being duplicated by each entity's ledger. Additionally, the data model being used for these transactions is often non-standard and not aligned across the value chain. This may result in a need to translate, enhance, and reconcile data at each stage. Finally, the workflows to support these transactions are supported individually by each entity, which may result in similar tasks, such as message validation and reconciliation, being performed multiple times over the entire transaction chain.

To overcome the aforementioned technical deficiencies, the systems and methods described herein may provide for three different elements that may be combined to disrupt the existing industry model and redefine how the investment value chain is supported. First, the systems and methods provide for one single, multi-entity shared ledger with a hierarchical data structure. The ledger may be shared by each entity in the transaction value chain. Transactions on the ledger may be immutable and prevent tampering, therefore creating trust in the ledger and its data. Transactions and positions may be recorded only once on the shared ledger and the data model attached to the transaction/position includes information about the entitlements to that data and ownership of the asset. For instance, the transaction and position would indicate the chain of intermediaries interested in that transaction/position, such as:

Investor A< >Broker A< >Global Custodian A< >Sub Custodian A< >Central Securities Depository A As the ledger is being used by more than one of the entities in this chain, this reduces the duplicative nature of the transaction processing because transactions and positions are included only once.

The shared ledger may provide multiple improvements over conventional systems. For example, the shared ledger may provide the following operational benefits: (1) the need for reconciliations between entities may be eliminated; (2) messaging may be reduced because it is now carried out centrally on a shared ledger rather than sequentially by each of the parties that are involved in a transaction; and (3) improved operational efficiency may result in lower cost, reduced risk, and better quality. The shared ledger may also provide the following benefits regarding confidence in data: (1) the shared ledger may contain a single golden record rather than multiple versions of transactions and positions; (2) reduced data latency because activities are performed on a central ledger rather than sequentially; and (3) higher confidence may result in faster and better decision making for each entity in the chain.

Second, the systems and methods described herein may provide for a single standard data model. The new data model may be produced for each domain and act as a standard for several entities within the investment chain. This model may contain a data set that is much richer than current standards (such as ISO 15022) and may support activity from investment through to settlement and safekeeping. For example, transaction settlement instructions are normally communicated in accordance within ISO 15022 or 20022 protocols. However, the ISO 15022 and 20022 protocols do not typically include a complete transaction record. Instead, these protocols typically only include an instruction or confirmation of a transaction. The new data model may include data that is already present in current ISO 15022 or 2022 protocols and additionally may be augmented with other transaction details sourced from various entities in the value chain to form one complete set of data. The new data model may be leveraged by the entire value chain as a single transaction record. For example, a computing device initiating a transaction on the distributed ledger may retrieve data (e.g., account balances) from the distributed ledger to confirm the transaction satisfies a transaction policy. The computing device may transmit the data to computing devices that help maintain the distributed ledger such that the computing devices may individually confirm the transaction satisfies the transaction policy and/or update the distributed ledger based on the transaction. This common data model may reduce the need for each entity in the chain to translate or enrich data being received from a counterparty within the chain. The combination of a common data model and a shared ledger can result in one common golden source of data for multiple parties in the investment chain. In some cases, this data model can be communicated via a variety of channels including API or cloud-based solutions.

The standard data model may provide multiple improvements over conventional systems. For example, the standard data model may reduce the need for translation or enrichment of data, thus eliminating the need for reconciliation and eliminating potential discrepancies between data stored in the different storage devices. The standard data model may further increase confidence in the data because the model enables for a single golden data record rather than multiple versions of transactions and positions. The increased confidence may translate into faster and better decision-making for each entity in the chain. The data model may further reduce data latency that may result from the different processors translating messages into different formats.

Third, the systems and methods described herein may provide for a single synchronized workflow. A common synchronized workflow may enable duplicative elements of transaction lifecycles to be removed. For instance, in conventional systems, each entity in the chain may validate a message as they receive it from their counterparty in the chain. They may also check that a position is available before processing that transactional message. A common data model and shared ledger can enable workflow to be synchronized across multiple parties and therefore perform required steps only once for the entire chain rather than multiple times at each entity in the chain, as occurs in conventional systems.

Additionally, the single synchronized workflow may provide several technological benefits. For example, certain steps such as reconciliation can be eliminated altogether. Further, the single synchronized workflow can increase operational efficiency by removing duplicative processes to reduce processing time, thus causing the transaction lifecycles to become simpler, shorter, and faster. The single synchronized workflow can also reduce the risk of errors because fewer steps and signals may be required to perform a transaction.

Figure 6A:
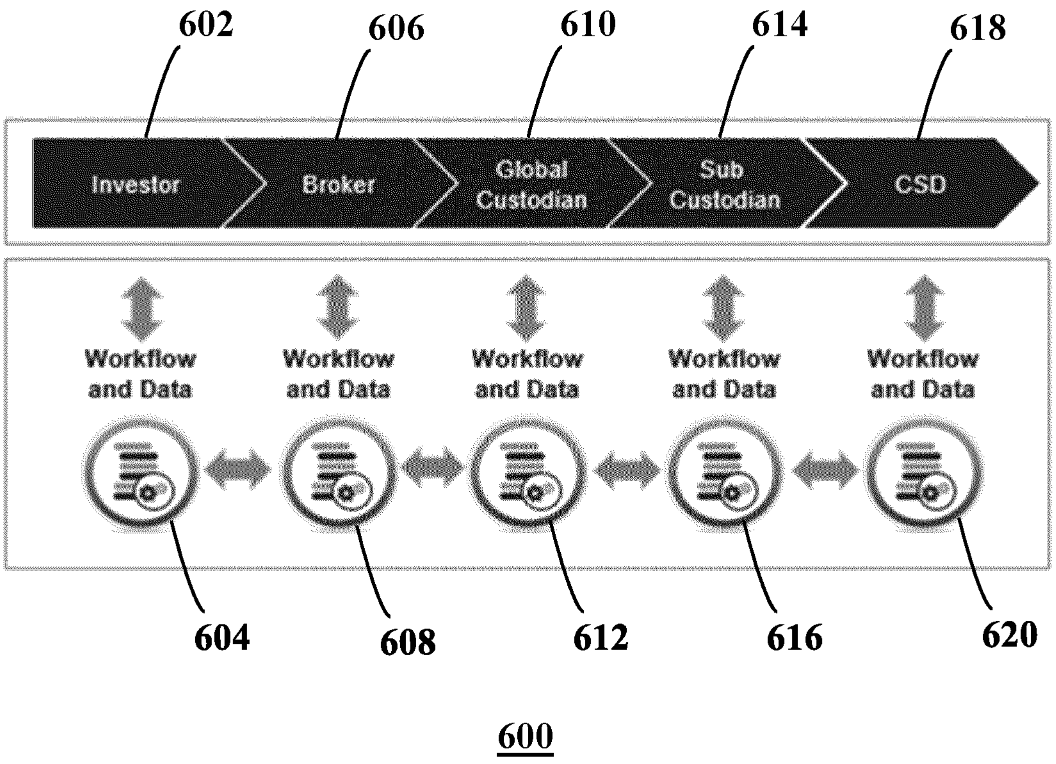
FIG. 6A graphically illustrates a prior art sequence for facilitating a transaction in a hierarchy-based system.

FIG. 6A illustrates an example prior art sequence 600 for facilitating a transaction in a hierarchy-based system. The sequence 600 represents a system that performs a transaction by transferring an asset from one entity (e.g., an investor) to another entity (a central securities depository) by exchanging signals between multiple intermediary entities.

At sequence 600, a node 602 (e.g., a computing device) represented as an investor may initiate a transaction to transfer an asset (e.g., a security) to a central securities depository 618. In doing so, the node 602 may receive a request from an investor via a user interface and access memory in a storage 604 (e.g., the node 602 may request data from a central database stored on a server or retrieve data from its own memory). The node 602 may access the memory to retrieve a value for an account of the investor (e.g., an account balance) and or any account limits the account may have for transactions. The node 602 may determine whether the investor's account has high enough balance and/or if the investor's account has any applicable restrictions to perform the transfer. The node 602 may then transmit a transfer request to a node 606 associated with (e.g., operated by) a broker, which may act as an intermediary device for facilitating transactions.

The node 606 may receive the transfer request from the node 602 and determine whether to allow the transaction. For example, the node 606 may only allow the transfer if the broker has a value in its account that is equal to or greater than the value of the asset being transferred to the central securities depository. Accordingly, when the node 606 receives the transaction request from the node 602, the node 606 can access a memory in a storage 608 to retrieve a value for the broker account (e.g., an account balance). The storage 608 may be similar to the storage 604 but may be physically separate from the storage 604 (e.g., storage 604 and 608 may be in separate data centers or in separate servers). The node 606 may determine if the retrieved value is at least equal to the value of the asset being transferred. Responsive to determining the value is at least equal to the value of the asset, the node 606 may transmit a transfer request to a node 610 associated with a global custodian, which may operate as another intermediary device for facilitating transactions. The node 610, a storage 612, a node 614 associated with a sub-custodian, and a storage 616 may then repeat these operations to determine if the transaction may be completed. If at any point during the sequence 600 a node determines the transaction may not be performed (e.g., the account associated with the node does not have a balance exceeding the value of the asset), the node may transmit a message back to the node 602 to indicate the transaction cannot be performed. However, if each of nodes 602, 606, 610, and 614 determines the transaction may be performed, the node 614 may transmit a signal to a node 618 associated with the central securities account indicating to transfer the asset in memory of a storage 620.

Performance of the sequence 600 for an asset transfer may require excess computing resources and result in significant latency. For example, each of the operations of the sequence 600 may involve computing resources for transmitting and receiving signals between the different nodes that are involved in the transaction as well as retrieving data from storage. Further, each node needs to use processing power to determine if the associated user account is capable of performing the transaction. Each of these operations may require computing resources and compute time, which can often result in significant latency. Finally, because each node is associated with a different memory storage and provides separate inputs into their databases, the nodes may store differing data between each other as transactions occur over time. The differing data may cause the system to encounter errors as the different computers may have inaccurate data indicating whether transactions between two accounts may occur. Such errors may result in troubleshooting and significant latency as an operator determines how to resolve the errors. Thus, it is desirable for a system that does not need to individually store data for individual user accounts to avoid errors in the data and to minimize the processing requirements to facilitate transactions across multiple intermediary nodes.

Figure 6B:
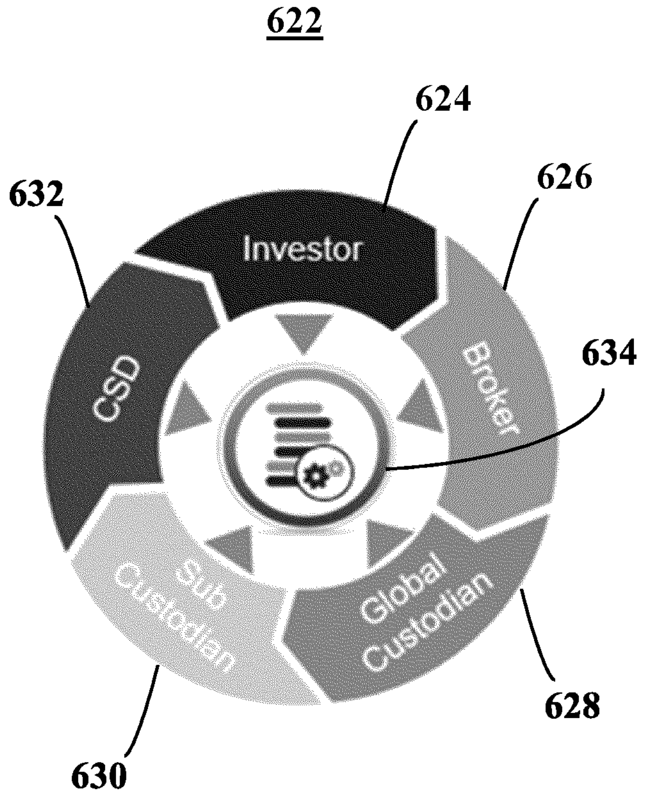
FIG. 6B graphically illustrates a sequence for facilitating a transaction in a hierarchy-based system, according to an embodiment.

FIG. 6B illustrates an example prior art sequence 622 for facilitating a transaction in a hierarchy-based system using the systems and methods described herein, according to some embodiments. The sequence 622 may be a sequence of a system (e.g., the system 100) that implements the systems and methods described herein by retrieving data from a commonly shared distributed ledger to facilitate a transaction transferring an asset from one entity to another entity across an entity hierarchy.

At sequence 622, nodes 624, 626, 628, 630, and 632 may overcome the aforementioned technical deficiencies by facilitating transactions through a distributed ledger 634 that is maintained by the nodes 624, 626, 628, 630, and 632. For example, the node 624 may be associated with a user account associated with an investor. The investor may access his or her account via the node 624 to transfer an asset to an account of a central securities depository, which may be associated with the node 632. The node 624 may receive a request for the asset transfer via the user interface and identify any intermediary nodes that need to validate the transfer (e.g., that the transfer needs to pass through or be validated by) for the transfer to be successful. The node 624 may identify the intermediary nodes from a hierarchical model (e.g., a hierarchical model stored on distributed ledger 634 as described above or a hierarchical model stored in a separate database). The intermediary nodes may be nodes that help establish and/or maintain the distributed ledger 634 such that data indicating values (e.g., account balances) for the intermediary nodes may be stored on the distributed ledger 634. The node 624 may retrieve the values for the nodes identified from the hierarchical file and compare the values to the value of the asset (e.g., a value threshold). If the node 624 determines the values for the identified intermediary nodes exceed the value of the asset, the node 624 may complete the transaction by generating a record (a file that includes the transaction attributes of the transaction) in the distributed ledger indicating the transfer of the asset from the investor account into the central securities depository.

Accordingly, a system implementing the process described with respect to sequence 622 may overcome the technical deficiencies of prior systems, such as the system described with respect to the sequence 600. For instance, implementing a transaction process using data on a shared ledger can improve operational efficiency because nodes no longer need to exchange signals, store data separately from each other, or separately determine whether their associated accounts are permitted to allow the transaction to go through. Instead, the node that is seeking to perform the transaction (e.g., the investor node) can retrieve any data that is necessary to permit the transaction across all of the intermediary nodes from the central distributed ledger and determine whether to continue with the transaction without exchanging any signals with other nodes. Thus, the systems and methods discussed herein provide a technical improvement over conventional systems because they reduce latency as well as the computer resource and memory requirements for facilitating transactions.

Figure 7:
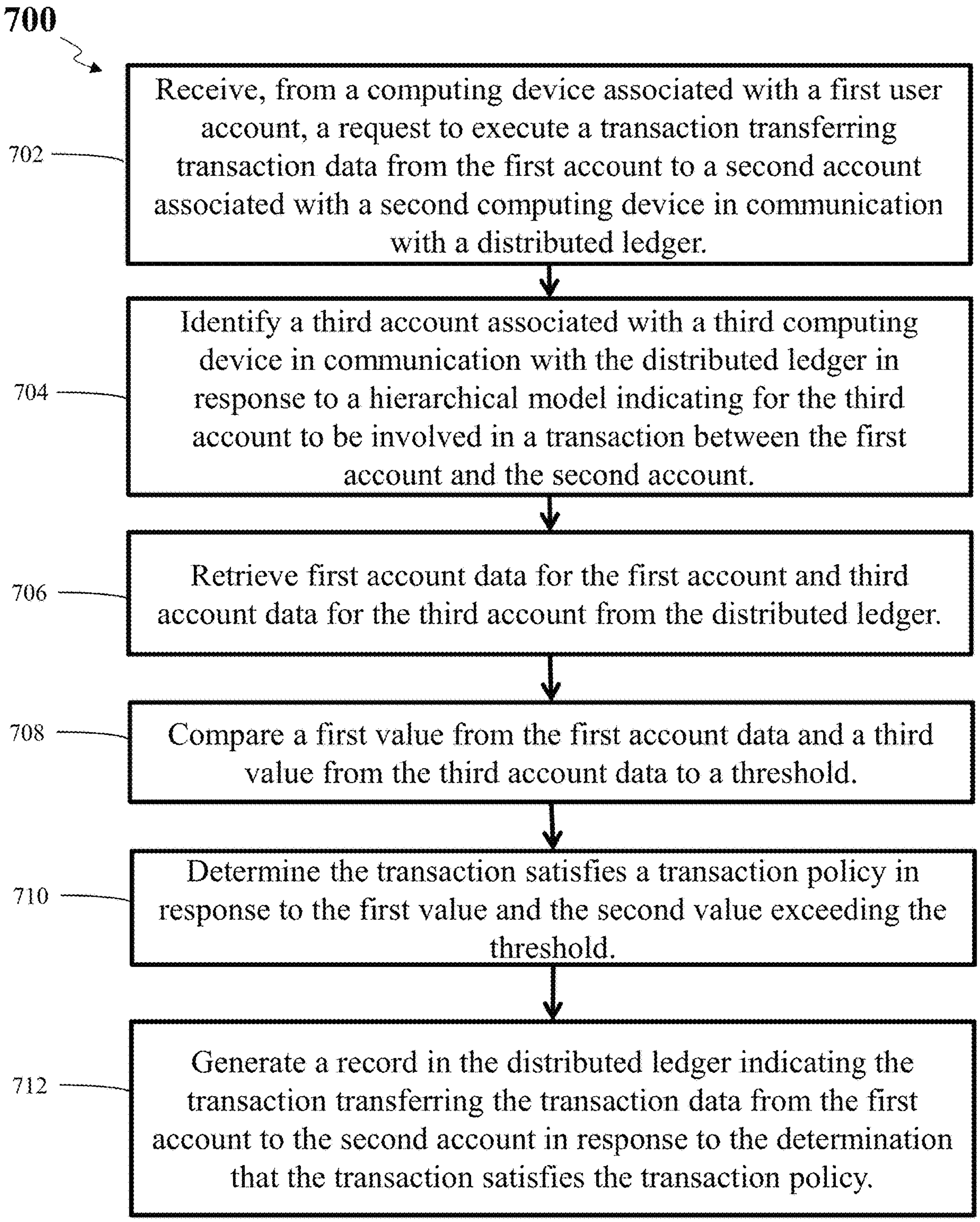
FIG. 7 illustrates a flowchart depicting operational steps for implementing a hierarchy-based distributed ledger system, according to an embodiment.

FIG. 7 illustrates a flowchart depicting operational steps for implementing a hierarchy-based distributed ledger system, according to an embodiment. Other embodiments may comprise additional or alternative steps, or may omit some steps altogether. Each of the steps of the method 700 may be performed (in some cases separately) by one or a combination of a server and/or any of a plurality of nodes that maintain a distributed ledger (e.g., a blockchain). In some cases, the steps of method 700 may be performed in the environments and/or embodiments described with respect to one or more of FIGS. 1-6.

At step 702, a first computing device in communication with a distributed ledger (e.g., a blockchain) may receive, from a computing device associated with a first account (e.g., a computing device that is accessing a first account for a user), a request to execute a transaction. The distributed ledger may be any type of distributed ledger that is established and maintained by devices associated with the same corporate umbrella and entities (e.g., a global custodian, a sub-custodian, etc.) that are associated with or access the devices. Data about transactions between the different computing devices may be maintained on the distributed ledger to maintain a trusted history of transactions that are performed between the different computing devices and/or accounts. The request may be a request to transfer transaction data (e.g., an asset or a value of an asset) from the first account to a second account associated with a second computing device of the enterprise that is in communication with the distributed ledger. The request may include an identification of the first account and the second account. For example, the request may be to transfer an asset (e.g., a bond, security, or cash) from the investor's account into an account in a central security depository.

As described herein, in embodiments in which the distributed ledger is a blockchain, the first computing device may maintain the blockchain by storing its own version of the blockchain in a local database. The first computing device may validate new transactions that occur on the blockchain by generating new block instances for individual transactions and based on previous data in the blockchain. For instance, the first computing device may receive data of the new transaction (e.g., an identification of the asset that is being transferred and any parties that are involved in the transaction), as described herein, determine block instances of the blocks that were previously on the stored chain, and/or append a new block instance for the new transaction to the blockchain by calculating (e.g., using a hashing algorithm such as SHA 128 or SHA 256) a new hash based on the transaction data for the new transaction and the hash of the previous block. The first computing device may then upload data from the new blockchain (e.g., the new hash or the entire blockchain itself) to other computing devices that maintain the blockchain and, if a quorum or consensus (e.g., a majority or another preset percentage or threshold number of computing devices) of computing devices that maintain the blockchain have matching data to the first computing device, then the computing device may store the new block. Otherwise, the first computing device may adjust the values of the blockchain to new values if a quorum of different computing devices have different data, or reject the transaction altogether if there is not a quorum for the transaction.

At step 704, the first computing device may identify a third account associated with a third computing device in communication with the distributed ledger. The first computing device may identify the third account from a hierarchical model. The hierarchical model may be the same as or similar to the hierarchical model described above and may indicate the different accounts and/or nodes that maintain the distributed ledger and that have an interest in transactions between the first account and the second account. The hierarchical model may be a file stored on the distributed ledger itself or in a database local to the first computing device. For example, the first computing device may identify the global custodian account associated with a third computing device from the hierarchical model based on the model indicating that any transaction between the first account and the second account needs to be approved by the global custodian account. Other examples of intermediary accounts may be a broker account and a sub-custodian account, computing devices for each of which may maintain and store transaction data on the same distributed ledger. The first computing device may identify any number of intermediary accounts or nodes that are designated to be involved in transactions between the first account and the second account from the hierarchical model. If the first computing device determines there are not any intermediary devices for the transaction (e.g., determines the hierarchical model does not include identifiers for any intermediary devices or accounts for transactions between the first and second accounts), the first computing device may not identify any intermediary accounts. However, if the hierarchical model indicates there is an applicable intermediary account that is involved in transactions between the first account and the second account, the first computing device may identify the third account from the hierarchical model.

At step 706, the first computing device may retrieve first account data for the first account and third account data for the third account from the distributed ledger. The first account data may indicate an account balance or value for the first account and the third account data may indicate an account balance or value for the third account (e.g., the intermediary account). In some cases, to do so, the first computing device may retrieve the first account data and/or the third account data from a single record in the blockchain. For example, the distributed ledger may maintain account balances for each entity that performs transactions through the distributed ledger, as described above. The account balances for a single account and may be stored in a single record such that the first computing device may more easily retrieve the account balances from the transferring account and the intermediary accounts from the distributed ledger without requiring any extra computation. For instance, the first computing device may identify the records via the record addresses (e.g., block addresses) that correspond to the different accounts based on a record address look-up table that the first computing device may maintain in local memory. The first computing device may identify the records in the distributed ledger for the first user account and any intermediary user accounts and retrieve the values for the accounts from the identified records.

In some cases, instead of storing account balances on the distributed ledger, the distributed ledger may only store records of the different transactions that occur between the computing devices that maintain the distributed ledger. In such cases, the aforementioned record address look-up table may store record addresses for the transactions that are performed by the different accounts. The first computing device may identify the records for the different historical transactions performed by the accounts that are involved in the present transaction and aggregate the balances based on the data that the first computing device retrieves from the distributed ledger. Accordingly, the systems and methods described herein may be performed without any single piece of data identifying account balances for the different accounts on the distributed ledger, thus increasing data privacy.

In cases in which the distributed ledger is a blockchain, the first computing device may identify block addresses (e.g., the hash values for the individual blocks of the blockchain) of blocks of the blockchain that store transaction data for the computing devices that maintain the blockchain. In such instances, the records described herein may be blocks in the blockchain and the record addresses may be the block addresses (e.g., the hash values for the individual blocks of the blockchain). For example, in cases in which the total balances for the individual computing devices or accounts are stored in the individual blocks, the first computing device may identify the most recent blocks (e.g., most recently created blocks or blocks that include the most recent time stamp) of the blockchain that include identifiers and balances of the computing devices or accounts the first computing device identified from the hierarchical data structure. The first computing device may identify such block instances by performing a look up in a stored look up table to identify block addresses that correspond to blocks that contain balances for the different computing devices or accounts and identify the blocks that contain the block addresses. In some cases, the first computing device may instead query the blockchain itself starting from the most recently appended blocks to identify the balances. In cases in which total balances are not stored in separate blocks of the blockchain, the first computing device may identify stored block addresses for each of the transactions that are performed by the different computing devices or accounts involved in the transactions, retrieve the data from the corresponding blocks based on the addresses, and aggregate the transaction data (e.g., add or subtract values from a counter based on whether the transaction was a transfer to or from the respective accounts) based on the retrieved data to determine the balances. In some cases, the first computing device may query the block instances and retrieve data from block instances that contain identifiers of the different computing devices or accounts to determine the balances for the accounts or computing devices.

At step 708, the first computing device may compare the first account data and/or the third account data to a transaction policy to determine whether to proceed with the transaction. For example, the first computing device may determine whether the first account and the third account each have an account balance that is high enough to enable the asset transfer from the first account to the second account. To do so, the first computing device, may compare the value of the asset being transferred (e.g., the value of the bond) from the first account (e.g., the account transferring the asset) to the individual values of the first account and the second account. The first computing device may determine if the values (e.g., balances) of the two accounts each exceed the value of the asset (or if the value of the asset is less than the value of the two accounts). If either of the two accounts does not have a value that is higher than the value of the asset being transferred, the first computing device may generate an alert to indicate the asset transfer cannot be completed. However, if both of the accounts have values that are higher than the value of the asset, at step 710, the first computing device may determine the transaction satisfies a transaction policy (e.g., one or more rules for the different computing devices or accounts that are involved in a transaction that, upon the first computing device determining the rules are satisfied, cause the first computing device to initiate the transaction, as is described herein). The first computing device may retrieve transaction data for any number of intermediary accounts that the first computing device identifies from the hierarchical model to determine if each identified intermediary account can perform the transaction.

In some cases, rules for transactions for the different accounts may be stored on the distributed ledger in addition to or instead of the account balances. For instance, a global custody account may have a transaction limit indicating the maximum value of an asset that can be transferred through the global custody account. A sub-custody account may have the same or a different maximum value and/or a limit to the number of transactions that can go through the custody account over a defined time period (e.g., a day, a month, or a year). Such rules may be stored and retrieved from the distributed ledger in addition to or instead of the account balances for the accounts such that the first computing device can determine if the transaction satisfies the rules for each of the intermediary accounts (e.g., the transaction is for a value lower than the maximum transfer limit for the accounts or the transaction does not cause the number of transactions performed by the account or the intermediary account to exceed a threshold established by one of the intermediary account). The rules may be stored in the distributed ledger (e.g., in rules records or rules block instances that are specific to the different computing devices or in a single rules record or rules block instance) with the balances for the individual accounts. In some cases, the rules may be stored in a static database stored by the first computing device. In addition to or instead of determining if the accounts have a value that exceeds the value of the asset being transferred. The first computing device may determine whether a computing device or account satisfies the transaction policy by comparing the value of the asset to a value of the respective account or computing device and/or determining whether the transaction satisfies any rules for the account or computing device.

In one example of using a stored rule to facilitate a transaction, a sub-custody account (or any account involved in the transaction according to the hierarchical model) may have a limit (e.g., threshold) to the number of transactions the sub-custody account can perform in a given time period, either in the aggregate across different accounts or solely for the first account. The first computing device may identify the transactions the sub-custody account has performed within the time period from the distributed ledger (e.g., identify the records that have been added to the distributed ledger as a result of completion of the transactions within the specified time period) to determine if the transaction transferring the asset from the first account to the second account exceeds the transaction limit. In instances in which the distributed ledger is a blockchain, the first computing device may identify blocks that have been added to the blockchain within the specified time period or that otherwise contain a time stamp within the time period. Depending on the rule, the first computing device may only identify records that identify transactions completed by the first account through the sub-custody account or all transactions that were completed through the sub-custody account. The first computing device may identify the records responsive to the records having a timestamp within the specified time period and an identification of the sub-custodian account. The first computing device may increment a counter for each record that indicates an identified transaction and compare the count of the counter to the limit. If the first computing device determines the transaction between the first account and the second account exceeds the limit, the first computing device may generate an alert indicating the transaction could not be completed. Otherwise, the first computing device may determine the transaction can be completed through the sub-custody account as long as any other rules for the sub-custody account are satisfied and/or the sub-custody account has a value that exceeds the value of the asset being transferred. The first computing device may retrieve the data to determine whether the transaction would break transaction limits of accounts involved in the chain from the distributed ledger. The first computing device may do so because the records of the transactions are stored on a shared ledger instead of in individual databases that are separately maintained by the different entities and are more likely to be accurate. Any accounts in a transaction chain may have such rules or any number of other rules.

Advantageously, the first computing device may retrieve the data to confirm the transaction can be performed from the distributed ledger that is shared among the transacting computing devices and any intermediary computing devices. Because the distributed ledger is maintained by multiple computing devices, the entity accessing the first computing device can be confident that the data will be accurate. Further, because the data on the distributed ledger is accessible to the entities that share the ledger, the first computing device may retrieve the data without sending separate signals to the intermediary computing devices, causing the intermediary computing devices to retrieve data from their local databases, sending signals between each other, or processing the transaction against their own sets of rules and data.

At step 712, the first computing device may generate a record in the distributed ledger indicating the transaction transferring the transaction data from the first account to the second account. The first computing device may generate the record in response to the determination that the transaction satisfies the transaction policy in step 710. The first computing device can generate the record in the ledger to include identifiers of the exchanging accounts as well as any intermediary accounts that were involved in the transaction per the hierarchical model. Thus, the record may maintain a proper chain of transfer between the accounts and may do so without any of the computing devices that maintain the accounts, including the computing device associated with the account that is receiving the asset, communicating with the first computing device to do so.

In some cases, the first computing device may generate the record by first identifying the account balance of the two accounts between which the asset is being transferred and updating the account balance to indicate the asset was removed from the first account and added to the second account. The first computing device may then generate separate records for each of the transacting devices and store the separate records on the distributed ledger such that each account may have a dedicated record that includes their updated balance or store both of the updated balances in the same record to conserve the memory needed to maintain the distributed ledger (e.g., minimize the number of blocks that would need to be validated on a blockchain).

In some cases, to generate the record in the distributed ledger, the first computing device may communicate transaction attributes for the transaction with the other computing devices that maintain the distributed ledger. For example, each message that is transmitted between the different devices may use a common data model with a common format and common transaction attributes (e.g., date, time, transaction amount, etc.) such that the devices do not need to reformat or request further information from any other device in the chain. The first computing device may transmit messages using the data model so the devices that maintain the distributed ledger may easily parse the messages by analyzing the data in the respective format and confirming the data to include in the record being added to the distributed ledger, thus reducing any discrepancies that may occur from data in different formats (e.g., using data from unsynchronized clocks, unsynchronized calendars, or unsynchronized digits after a decimal). The model may help ensure records may be added to the distributed ledger quickly without any node that maintains the ledger having a differing record solely for data formatting discrepancies (e.g., a node may not accurately vote to make a quorum in a blockchain because the transaction data in the nodes generated block may be to one decimal place instead of two decimal places).

In cases in which the distributed ledger is a blockchain, the first computing device may add a block to the blockchain for the transaction and/or add multiple blocks to the blockchain containing the new total balance for each of the computing devices in the chain for the transaction. For example, upon determining the rules for the different computing devices or accounts in the chain for the transaction are satisfied (e.g., that the transaction policy for the transaction is satisfied), the first computing device may generate a block containing identifiers of each of the computing devices or accounts in the chain and the transaction data for the transaction. The first computing device may calculate a hash of the data in the block and the hash of the previous block to append the block to the blockchain. In another example, the first computing device may add blocks to the blockchain that contain the new total balance for each computing device or account that was involved in the chain for the transaction. To do so, the first computing device may identify the previous total balance for each of the computing devices or accounts, adjust the total balance based on the transaction, and generate and append new block instances containing the new balances to the blockchain. Thus, an immutable record of the transactions and/or account balances may be maintained on the blockchain.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

I claim:

1. A method comprising:

receiving, by a first computing device in communication with a plurality of nodes maintaining a distributed ledger from a computing device associated with a first account, a request to execute a transaction transferring an asset from the first account to a second account associated with a second computing device in communication with the plurality of nodes maintaining the distributed ledger, the request comprising an identification of the first account and the second account;

identifying, by the first computing device, a first record of the distributed ledger responsive to the first record storing a hierarchical model indicating relationships between accounts maintained through the distributed ledger;

identifying, by the first computing device, a third account associated with a third computing device in communication with the plurality of nodes maintaining the distributed ledger in response to the hierarchical model indicating for the third account to be involved in transactions between the first account and the second account;

retrieving, by the first computing device from a database of the third computing device, one or more rules associated with the third computing device;

determining, by the first computing device, transaction attributes of the transaction or data associated with at least one of the first computing device or the third computing device satisfy the one or more rules associated with the third computing device; and appending, by the first computing device, a second record to a third record of the distributed ledger indicating the transaction transferring the asset from the first account to the second account in response to the determination that the transaction attributes of the transaction or the data associated with at least one of the first computing device or the second computing device satisfy the one or more rules associated with the third computing device.

2. The method of claim 1, wherein appending the second record to the third record of the distributed ledger comprises storing, by the first computing device, identifications of the first account, the second account, and the third account in the second record.

3. The method of claim 1, further comprising:

determining, by the first computing device, the transaction attributes of the transaction or the data associated with at least one of the first computing device or the third computing device satisfy the one or more rules associated with the third computing device based on the data associated with at least one of the first computing device or the third computing device indicating the first account and the third account are each capable of performing the transaction.

4. The method of claim 1, comprising:

retrieving, by the first computing device, a first account balance of the first account and a third account balance of the third account from the distributed ledger; and determining, by the first computing device, the first account balance of the first account and the third account balance of the third account satisfy the one or more rules.

5. The method of claim 4, wherein retrieving the first account balance comprises:

aggregating, by the first computing device, balances from any transactions that were recorded on the distributed ledger that involved the first account.

6. The method of claim 1, comprising:

retrieving, by the first computing device, data of the first account from a single record in the distributed ledger; and determining, by the first computing device, at least the data of the first account satisfies the one or more rules.

7. The method of claim 6, wherein the distributed ledger comprises a blockchain, and wherein retrieving the data of the first account from the single record in the distributed ledger comprises retrieving, by the first computing device, the data of the first account from a single block instance that was previously appended to the blockchain.

8. The method of claim 6, wherein appending the second record to the third record of the distributed ledger comprises:

updating, by the first computing device, the data of the first account based on the transaction; and appending, by the first computing device, the second record to the third record of the distributed ledger to include the updated data of the first account.

9. The method of claim 1, wherein appending the second record to the third record of the distributed ledger comprises transmitting, by the first computing device, one or more messages comprising the transaction attributes of the transaction to one or more computing devices in communication with the distributed ledger, wherein the transaction attributes are formatted according to a common data model shared between the first computing device and the one or more computing devices.

10. The method of claim 1, wherein appending the second record to the third record of the distributed ledger comprises appending, by the first computing device, the second record to the third record of the distributed ledger without communicating with the second computing device.

11. A system comprising:

a first computing device comprising a network interface in communication with a computing device associated with a first account and a plurality of nodes maintaining a distributed ledger, a memory device storing an instance of a distributed ledger, and a processor configured to:

receive, via the network interface, a request to execute a transaction transferring an asset from the first account to a second account associated with a second computing device in communication with the plurality of nodes maintaining the distributed ledger, the request comprising an identification of the first account and the second account;

identify a first record of the distributed ledger responsive to the first record storing a hierarchical model indicating relationships between accounts maintained through the distributed ledger;

identify a third account associated with a third computing device in communication with the plurality of nodes maintaining the distributed ledger in response to the hierarchical model indicating for the third account to be involved in transactions between the first account and the second account;

retrieve, from a database of the third computing device, one or more rules associated with the third computing device;

determine transaction attributes of the transaction or data associated with at least one of the first computing device or the third computing device satisfy the one or more rules associated with the third computing device; and append a second record to a third record of the distributed ledger indicating the transaction transferring the asset from the first account to the second account in response to the determination that the transaction attributes of the transaction or the data associated with at least one of the first computing device or the second computing device satisfy the one or more rules associated with the third computing device.

12. The system of claim 11, wherein the processor is configured to append the second record to the third record of the distributed ledger by storing identifications of the first account, the second account, and the third account in the second record.

13. The system of claim 11, wherein the processor is further configured to:

determine the transaction attributes of the transaction or the data associated with at least one of the first computing device or the third computing device satisfy the one or more rules associated with the third computing device based on the data associated with at least one of the first computing device or the third computing device indicating the first account and the third account are each capable of performing the transaction.

14. The system of claim 11, wherein the processor is configured to:

retrieve a first account balance of the first account and a third account balance of the third account from the distributed ledger; and determine the first account balance of the first account and the third account balance of the third account satisfy the one or more rules.

15. The system of claim 14, wherein the processor is configured to retrieve the first account balance by:

aggregating balances from any transactions that were recorded on the distributed ledger that involved the first account.

16. The system of claim 11, wherein the processor is configured to:

retrieve data of the first account from a single record in the distributed ledger; and determine at least the data of the first account satisfies the one or more rules.

17. The system of claim 16, wherein the distributed ledger comprises a blockchain, and wherein the processor is configured to retrieve the data of the first account from the single record in the distributed ledger by retrieving the data of the first account from a single block instance that was previously appended to the blockchain.

18. The system of claim 16, wherein the processor is configured to append the second record to the third record of the distributed ledger by:

updating the data of the first account based on the transaction; and appending the second record to the third record of the distributed ledger to include the updated data of the first account.

19. The system of claim 11, wherein the processor is configured to append the second record to the third record of the distributed ledger by transmitting one or more messages comprising the transaction attributes of the transaction to one or more computing devices in communication with the distributed ledger, wherein the transaction attributes are formatted according to a common data model shared between the processor and the one or more computing devices.

20. The system of claim 11, wherein the processor is configured to append the second record to the third record of the distributed ledger by appending the second record to the third record of the distributed ledger without communicating with the second computing device.

* * * * *